United States Patent
Raghavan et al.

(10) Patent No.: US 6,656,078 B1
(45) Date of Patent: Dec. 2, 2003

(54) FAMILY OF SIX-SPEED PLANETARY TRANSMISSIONS HAVING THREE PLANETARY GEARSETS AND THREE INPUT TORQUE-TRANSMITTING MECHANISMS

(75) Inventors: Madhusudan Raghavan, West Bloomfield, MI (US); Norman Kenneth Bucknor, Troy, MI (US); Patrick Benedict Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/161,868

(22) Filed: Jun. 4, 2002

(51) Int. Cl.[7] ................................................ F16H 3/62
(52) U.S. Cl. ...................................................... 475/276
(58) Field of Search .................................. 475/275, 276

(56) References Cited

U.S. PATENT DOCUMENTS

| 4,070,927 A | | 1/1978 | Polak ............................ 74/765 |
| 5,106,352 A | | 4/1992 | Lepelletier ................... 475/753 |
| 5,226,862 A | * | 7/1993 | Hattori ......................... 475/286 |
| 5,435,792 A | * | 7/1995 | Justice et al. ................ 475/276 |
| 5,542,889 A | * | 8/1996 | Pierce et al. ................. 475/275 |
| 5,599,251 A | | 2/1997 | Beim et al. .................. 475/275 |
| 5,772,552 A | * | 6/1998 | Ibaraki et al. ............... 475/281 |
| 6,071,208 A | | 6/2000 | Koivunen ..................... 475/275 |
| 6,083,135 A | | 7/2000 | Baldwin et al. ............. 475/276 |

FOREIGN PATENT DOCUMENTS

EP          1033510          6/2000

* cited by examiner

*Primary Examiner*—Dirk Wright
(74) *Attorney, Agent, or Firm*—Kathryn A. Marra

(57) ABSTRACT

A family of multi-speed planetary transmissions has three planetary gearsets each with three planetary members and five torque-transmitting mechanisms. The transmission also has two interconnecting members, one of which interconnects a member of each of the planetary gearsets, and the other of which interconnects two members of the planetary gearsets. All of the transmission family members include one member continuously connected with a stationary member or transmission housing. In each family member, the input shaft of the transmission is selectively connectible with the planetary gearsets through three of the torque-transmitting mechanisms. The output shaft of the transmission is continuously connected with at least one member of the planetary gearset. The torque-transmitting mechanisms are selectively engaged in combinations of two to establish at least six forward speed ratios and one reverse speed ratio.

9 Claims, 10 Drawing Sheets

| | RATIOS | 56 | 58 | 50 | 52 | 54 |
|---|---|---|---|---|---|---|
| REVERSE | -4.37 | | X | | | X |
| NEUTRAL | 0 | | X | | | |
| 1 | 4.58 | | X | | X | |
| 2 | 2.41 | X | | | X | |
| 3 | 1.61 | | | | X | X |
| 4 | 1.00 | | | X | X | |
| 5 | 0.70 | | | X | | X |
| 6 | 0.60 | X | | X | | |

(X=engaged)

Ring Gear/Sun Gear Tooth Ratios: $\frac{R1}{S1}=2.98, \frac{R2}{S2}=1.53, \frac{R3}{S3}=1.85$

| Ratio Spread | 7.56 |
|---|---|
| Ratio Steps | |
| REV/1 | -0.95 |
| 1/2 | 1.90 |
| 2/3 | 1.50 |
| 3/4 | 1.61 |
| 4/5 | 1.42 |
| 5/6 | 1.16 |

|  | RATIOS | 156 | 158 | 150 | 152 | 154 |
|---|---|---|---|---|---|---|
| REVERSE | -2.55 |  | X |  |  | X |
| NEUTRAL | 0 |  | X |  |  |  |
| 1 | 4.61 |  | X |  | X |  |
| 2 | 2.42 | X |  |  | X |  |
| 3 | 1.31 |  |  |  | X | X |
| 4 | 1.00 |  |  | X | X |  |
| 5 | 0.79 |  |  | X |  | X |
| 6 | 0.60 | X |  | X |  |  |

(X=engaged)

Ring Gear/Sun Gear Tooth Ratios: $\frac{R1}{S1}=1.54, \frac{R2}{S2}=3.00, \frac{R3}{S3}=1.51$

| Ratio Spread | 7.61 |
|---|---|
| Ratio Steps |  |
| REV/1 | -0.55 |
| 1/2 | 1.90 |
| 2/3 | 1.86 |
| 3/4 | 1.31 |
| 4/5 | 1.26 |
| 5/6 | 1.31 |

| | RATIOS | 256 | 258 | 250 | 252 | 254 |
|---|---|---|---|---|---|---|
| REVERSE | -2.55 | X | | | | X |
| NEUTRAL | 0 | X | | | | |
| 1 | 4.61 | X | | | X | |
| 2 | 2.42 | | X | | X | |
| 3 | 1.31 | | | | X | X |
| 4 | 1.00 | | | X | X | |
| 5 | 0.79 | | | X | | X |
| 6 | 0.60 | | X | X | | |

( X = engaged )

Ring Gear/Sun Gear Tooth Ratios: $\frac{R1}{S1} = 1.54$, $\frac{R2}{S2} = 3.00$, $\frac{R3}{S3} = 1.51$

| Ratio Spread | 7.61 |
|---|---|
| Ratio Steps | |
| REV/1 | -0.55 |
| 1/2 | 1.90 |
| 2/3 | 1.86 |
| 3/4 | 1.31 |
| 4/5 | 1.26 |
| 5/6 | 1.31 |

| | RATIOS | 456 | 458 | 450 | 452 | 454 |
|---|---|---|---|---|---|---|
| REVERSE | -1.86 | | X | X | | |
| NEUTRAL | 0 | | X | | | |
| 1 | 2.82 | | X | | X | |
| 2 | 1.64 | X | | | X | |
| 3 | 1.00 | | | X | X | |
| 4 | 0.74 | | | | X | X |
| 5 | 0.55 | | | X | | X |
| 6 | 0.42 | X | | | | X |

(X=engaged)

Ring Gear/Sun Gear Tooth Ratios: $\frac{R1}{S1}=1.86, \frac{R2}{S2}=1.52, \frac{R3}{S3}=1.88$

| Ratio Spread | 6.64 |
|---|---|
| Ratio Steps | |
| REV/1 | -0.66 |
| 1/2 | 1.72 |
| 2/3 | 1.64 |
| 3/4 | 1.34 |
| 4/5 | 1.35 |
| 5/6 | 1.30 |

|  | RATIOS | 558 | 550 | 552 | 554 | 556 |
|---|---|---|---|---|---|---|
| REVERSE | -2.55 | X |  |  | X |  |
| NEUTRAL | 0 | X |  |  |  |  |
| 1 | 4.61 | X |  | X |  |  |
| 2 | 2.42 |  |  | X |  | X |
| 3 | 1.31 |  |  | X | X |  |
| 4 | 1.00 |  | X | X |  |  |
| 5 | 0.79 |  | X |  | X |  |
| 6 | 0.60 |  | X |  |  | X |

(X=engaged)

Ring Gear/Sun Gear Tooth Ratios: $\frac{R1}{S1}=1.54, \frac{R2}{S2}=3.00, \frac{R3}{S3}=1.51$

| Ratio Spread | 7.61 |
|---|---|
| Ratio Steps |  |
| REV/1 | -0.55 |
| 1/2 | 1.90 |
| 2/3 | 1.86 |
| 3/4 | 1.31 |
| 4/5 | 1.26 |
| 5/6 | 1.31 |

| | RATIOS | 658 | 650 | 652 | 654 | 656 |
|---|---|---|---|---|---|---|
| REVERSE | -1.86 | | X | | | X |
| NEUTRAL | 0 | | | | | X |
| 1 | 2.82 | | | X | | X |
| 2 | 1.64 | X | | X | | |
| 3 | 1.00 | | X | X | | |
| 4 | 0.74 | | | X | X | |
| 5 | 0.55 | | X | | X | |
| 6 | 0.42 | X | | | X | |

(X=engaged)

Ring Gear/Sun Gear Tooth Ratios: $\frac{R1}{S1}=1.86, \frac{R2}{S2}=1.52, \frac{R3}{S3}=1.88$

| Ratio Spread | 6.64 |
|---|---|
| Ratio Steps | |
| REV/1 | -0.66 |
| 1/2 | 1.72 |
| 2/3 | 1.64 |
| 3/4 | 1.34 |
| 4/5 | 1.35 |
| 5/6 | 1.30 |

| | RATIOS | 756 | 758 | 750 | 752 | 754 |
|---|---|---|---|---|---|---|
| REVERSE | -2.55 | | X | | | X |
| NEUTRAL | 0 | | X | | | |
| 1 | 4.61 | | X | | X | |
| 2 | 2.42 | X | | | X | |
| 3 | 1.31 | | | | X | X |
| 4 | 1.00 | | | X | X | |
| 5 | 0.79 | | | X | | X |
| 6 | 0.60 | X | | X | | |

(X=engaged)

Ring Gear/Sun Gear Tooth Ratios: $\frac{R1}{S1}=1.54, \frac{R2}{S2}=3.00, \frac{R3}{S3}=2.51$

| Ratio Spread | 7.61 |
|---|---|
| Ratio Steps | |
| REV/1 | -0.55 |
| 1/2 | 1.90 |
| 2/3 | 1.86 |
| 3/4 | 1.31 |
| 4/5 | 1.26 |
| 5/6 | 1.31 |

| | RATIOS | 856 | 858 | 850 | 852 | 854 |
|---|---|---|---|---|---|---|
| REVERSE | -1.86 | X | | X | | |
| NEUTRAL | 0 | X | | | | |
| 1 | 2.82 | X | | | X | |
| 2 | 1.64 | | X | | X | |
| 3 | 1.00 | | | X | X | |
| 4 | 0.74 | | | | X | X |
| 5 | 0.55 | | | X | | X |
| 6 | 0.42 | | X | | | X |

(X=engaged)

Ring Gear/Sun Gear Tooth Ratios: $\frac{R1}{S1}=1.86, \frac{R2}{S2}=2.52, \frac{R3}{S3}=1.88$

| Ratio Spread | 6.64 |
|---|---|
| Ratio Steps | |
| REV/1 | -0.66 |
| 1/2 | 1.72 |
| 2/3 | 1.64 |
| 3/4 | 1.34 |
| 4/5 | 1.35 |
| 5/6 | 1.30 |

| | RATIOS | 958 | 950 | 952 | 954 | 956 |
|---|---|---|---|---|---|---|
| REVERSE | -2.55 | X | | | X | |
| NEUTRAL | 0 | X | | | | |
| 1 | 4.61 | X | | X | | |
| 2 | 2.42 | | | X | | X |
| 3 | 1.31 | | | X | X | |
| 4 | 1.00 | | X | X | | |
| 5 | 0.79 | | X | | X | |
| 6 | 0.60 | | X | | | X |

(X=engaged)

Ring Gear/Sun Gear Tooth Ratios: $\frac{R1}{S1}=2.54, \frac{R2}{S2}=3.00, \frac{R3}{S3}=1.51$

| Ratio Spread | 7.61 |
|---|---|
| Ratio Steps | |
| REV/1 | -0.55 |
| 1/2 | 1.90 |
| 2/3 | 1.86 |
| 3/4 | 1.31 |
| 4/5 | 1.26 |
| 5/6 | 1.31 |

FAMILY OF SIX-SPEED PLANETARY TRANSMISSIONS HAVING THREE PLANETARY GEARSETS AND THREE INPUT TORQUE-TRANSMITTING MECHANISMS

TECHNICAL FIELD

The present invention relates to planetary transmissions and, more particularly, to a family of planetary transmissions providing at least six forward speed ratios and a reverse speed ratio utilizing three planetary gearsets and five torque-transmitting mechanisms.

BACKGROUND OF THE INVENTION

Passenger vehicles include a powertrain that is comprised of an engine, multi-speed transmission, and a differential or final drive mechanism. The multi-speed transmission increases the overall operating range of the vehicle by permitting the engine to operate through its torque range a number of times as the transmission ratios are interchanged. The number of forward speed ratios that are available in a transmission determines the number of ratio interchanges that can occur and therefore the number of times the engine torque range can be repeated.

Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; U.S. Pat. No. 5,599,251 issued to Beim and McCarrick on Feb. 4, 1997, U.S. Pat. No. 6,083,135 issued to Baldwin et al. on Jul. 4, 2000, and European Patent Application No. EP 1 033 510 A1 published Jun. 9, 2000.

Six speed transmissions offer several advantages over four and five speed transmissions, including improved vehicle acceleration and improved fuel economy. While many trucks employ six-speed transmissions, such as Polak, passenger cars are still manufactured, for the main part, with three and four speed automatic transmissions, and relatively few five or six speed devices due to the size and complexity of these transmissions. The Polak transmission provides six forward speed ratios with three planetary gearsets, two clutches, and three brakes. The Koivunen and Beim patents utilize six torque transmitting devices including four brakes and two clutches to establish the six forward speed ratios and one reverse ratio. The Lepelletier and the EP publications each employ three planetary gearsets, three clutches and two brakes to provide six forward speed ratios and one reverse ratio. One of the planetary gearsets in each of these publications is positioned and operated to establish two fixed speed input members for the remaining two planetary gearsets.

SUMMARY OF THE INVENTION

It is an object of the present invention to provide an improved family of transmissions providing six forward speed ratios and one reverse speed ratio.

In one aspect of the present invention, each of the family members incorporates three planetary gearsets and five selectively engageable torque-transmitting mechanisms.

In another aspect of the present invention, each of the planetary gearsets has three planetary members with a first member of the first planetary gearset being continuously interconnected with a first member of the second planetary gearset, and a first member of the third planetary gearset.

In another aspect of the present invention, a second interconnecting member continuously interconnects a second member of the first planetary gearset with a second member of the second planetary gearset.

In still another aspect of the present invention, a second member of the third planetary gearset is continuously connected with a stationary member of the transmission, such as a transmission case or housing.

In yet still another aspect of the present invention, a transmission output shaft is continuously connected with at least one member of one of the planetary gearsets.

In another aspect of the present invention, an input shaft is selectively connectible with the planetary gearsets through three selectively engageable torque-transmitting mechanisms.

In a further aspect of the present invention, a first of the five torque-transmitting mechanisms selectively interconnects the input shaft with a member of the first or second planetary gearset.

In a yet further aspect of the present invention, a second of the torque-transmitting mechanisms selectively interconnects the input shaft with at least one member of one of the planetary gearsets.

In still a further aspect of the present invention, a third of the torque-transmitting mechanisms selectively interconnects the input shaft with at least one member of the first, second, or third planetary gearsets.

In yet still a further aspect of the present invention, a fourth of the torque-transmitting mechanisms provides either a selective connection between the transmission housing and at least one member of the planetary gearsets, or a selective interconnection between a member of one of the planetary gearsets with another member of one of the planetary gearsets.

In a further aspect of the present invention, a fifth of the torque-transmitting mechanisms selectively interconnects a member of one of the planetary gearsets with a stationary housing or transmission case.

In still a further aspect of the present invention, the five torque-transmitting mechanisms are selectively engageable in combinations of two to at least establish six forward speed ratios and one reverse speed ratio between the input shaft and the output shaft of the transmission.

DESCRIPTION OF THE EXEMPLARY EMBODIMENTS

Figures 1, 2:
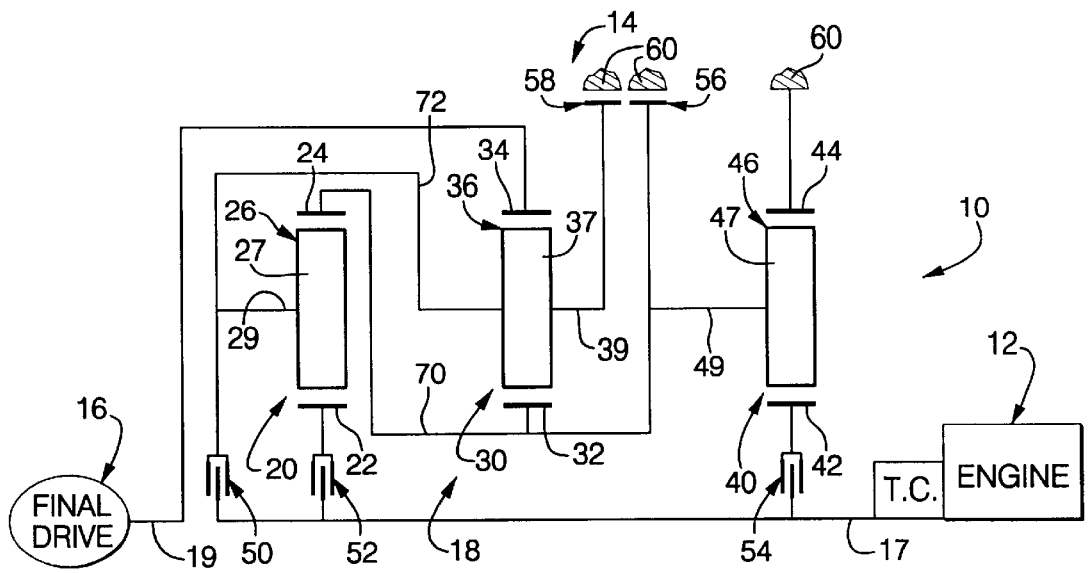
FIG. 1 is a schematic representation of a powertrain incorporating one embodiment of the present invention.
FIG. 2 is a truth table and chart depicting some of the operating characteristics of the embodiment of the invention shown in FIG. 1.

Referring to the drawings, wherein like characters represent the same or corresponding parts throughout the several views, there is seen in FIG. 1 a powertrain 10 having a conventional engine and torque converter 12, a planetary transmission 14, and a conventional final drive mechanism 16. The planetary transmission 14 includes an input shaft 17, a planetary gear arrangement 18, and an output shaft 19. The input shaft 17 is continuously connected with the engine and torque converter 12, and the output shaft 19 is continuously connected with the final drive mechanism 16.

The planetary gear arrangement 18 includes three planetary gearsets 20, 30, and 40, and five torque-transmitting mechanisms 50, 52, 54, 56, and 58. The torque-transmitting mechanisms 50, 52, and 54 are conventional rotating type torque-transmitting mechanisms, commonly termed clutches. As is well known in the art, the rotating type torque-transmitting mechanisms or clutches are fluid-operated frictional mechanisms that incorporate a plurality of friction discs and at least one operating system. The torque-transmitting mechanisms 56 and 58 are stationary type torque-transmitting mechanisms, commonly termed brakes. As is well known, these torque-transmitting mechanisms are also fluid-operated friction devices that might be of either the band type or of the disc type.

The planetary gearset 20 includes a sun gear member 22, a ring gear member 24, and a planet carrier assembly member 26. The planet carrier assembly member 26 includes a plurality of pinion gears 27 rotatably mounted on a planet carrier 29 and disposed in meshing relationship with both the sun gear member 22 and the ring gear member 24. The schematic representation shows a single pinion gear member 27, however, it is well known in the art that the planet carrier 29 is designed to incorporate three or four planetary pinion gears so as to distribute the torque transmission evenly through the planet carrier assembly member 26.

The planetary gearset 30 includes a sun gear member 32, a ring gear member 34, and a planet carrier assembly member 36. The planet carrier assembly member 36 includes a plurality of pinion gears 37 rotatably mounted on planet carrier 39 and disposed in meshing relationship with both the sun gear member 32 and the ring gear member 34. The schematic representation shows a single pinion gear member 37, however, it is well known in the art that the planet carrier 39 is designed to incorporate three or four planetary pinion gears so as to distribute the torque transmission evenly through the planet carrier assembly member 36.

The planetary gearset 40 includes a sun gear member 42, a ring gear member 44, and a planet carrier assembly member 46. The planet carrier assembly member 46 includes a plurality of pinion gears 47 rotatably mounted on a planet carrier 49 and disposed in meshing relationship with both the sun gear member 42 and the ring gear member 44. The schematic representation shows a single pinion gear member 47, however, it is well known in the art that the planet carrier 49 is designed to incorporate three or four planetary pinion gears so as to distribute the torque transmission evenly through the planet carrier assembly member 46.

Each of the planetary gearsets 20, 30, and 40 are of the single pinion type. Those skilled in the art will recognize that when the planet carrier assembly member of such gearsets is held stationary and the sun gear member is rotated, the ring gear member will rotate in the opposite direction. This is opposed to a double pinion planet carrier assembly member wherein the ring gear member and the sun gear member rotate in the same direction when the planet carrier assembly member is held stationary.

As seen in FIG. 2, the torque-transmitting mechanisms 50, 52, 54, 56, and 58 are selectively engaged in combinations of two to establish a reverse speed ratio and six forward speed ratios through the planetary gear arrangement 18 between the input shaft 17 and the output shaft 19. The truth table of FIG. 2 also provides an example of numerical values that are attainable with the planetary gear arrangement 18 when the ring gear/sun gear tooth ratios of the planetary gearsets 20, 30, and 40 are given as shown in FIG. 2 as R1/S1, R2/S2, and R3/S3, respectively. Also shown in FIG. 2 is an example of the ratio steps between adjacent forward speed ratios as well as between the reverse and first forward speed ratio that are present when the given speed ratios are employed. It can be further ascertained from FIG. 2 that each of the single step forward interchanges as well as the double step forward interchanges are of the single transition variety. That is, the interchange from first to second or from first to third requires merely the swapping of a single torque-transmitting mechanism while the other torque-transmitting mechanism remains engaged through this interchange.

The ring gear member 24, the sun gear member 32, and the planet carrier assembly member 46 are continuously interconnected by interconnecting member 70. The planet carrier assembly member 26 and the planet carrier assembly member 36 are continuously interconnected by an interconnecting member 72. The ring gear member 34 is continuously connected with the output shaft 19.

The input shaft 17 is selectively connectible with the interconnecting member 72 through the torque-transmitting mechanism 50, selectively connectible with sun gear member 22 through the torque-transmitting mechanism 52, and selectively connectible with the sun gear member 42 through the torque-transmitting mechanism 54. The ring gear member 44 is continuously connected with a transmission housing 60. The interconnecting member 70 is selectively connectible with the transmission housing 60 through the torque-transmitting mechanism 56. The interconnecting members 72 is selectively connectible with the transmission housing 60 through the torque-transmitting mechanism 58. It will be noted by those skilled in the art that the sun gear members 22 and 42 are not otherwise continuously interconnected with members of the other planetary gearsets except through the selective operation of the respective torque-transmitting mechanisms 52 and 54.

As shown in the truth table in FIG. 2, the reverse speed ratio is established with the engagement of the torque-transmitting mechanisms 54 5 and 58. During the reverse speed ratio, the planet carrier assembly member 46 and sun gear member 32 are rotated at a speed determined by the speed of the sun gear member 42 and the ring gear/sun gear tooth ratio of the planetary gearset 40. The ring gear member 34 and therefore output shaft 19 are rotated at a speed determined by the speed of the sun gear member 32 and the ring gear/sun gear tooth ratio of the planetary gearset 30. The numerical value of the reverse speed ratio is determined by the ring gear/sun gear tooth ratios of the planetary gearsets 30 and 40.

The first forward speed ratio is established with the engagement of the torque-transmitting mechanisms 52 and 58. During the first forward speed ratio, the ring gear member 24 and sun gear member 32 are rotated at a speed determined by the speed of the sun gear member 22 and the ring gear/sun gear tooth ratio of the planetary gearset 20. The ring gear member 34 and therefore output shaft 19 are rotated at a speed determined by the speed of the sun gear member 32 and the ring gear/sun gear tooth ratio of the planetary gearset 30. The numerical value of the first forward speed ratio is determined by the ring gear/sun gear tooth ratios of the planetary gearsets 20 and 30.

The second forward speed ratio is established with the engagement of the torque-transmitting mechanisms 52 and 56. During the second forward speed ratio, the planet carrier assembly member 26 and planet carrier assembly member 36 are driven at a speed determined by the speed of the sun gear member 22 and the ring gear/sun gear tooth ratio of the planetary gearset 20. The ring gear member 34 and output shaft 19 are rotated at a speed determined by the speed of the planet carrier assembly member 36 and the ring gear/sun gear tooth ratio of the planetary gearset 30. The numerical value of the second forward speed ratio is determined by the ring gear/sun gear tooth ratios of the planetary gearsets 20 and 30.

The third forward speed ratio is established with the engagement of the torque-transmitting mechanisms 52 and 54. During the third forward speed ratio, the planet carrier assembly member 46, sun gear member 32, and the ring gear member 24 are driven at a speed determined by the speed of the sun gear member 42 and the ring gear/sun gear tooth ratio of the planetary gearset 40. The planet carrier assembly members 26 and 36 are driven at a speed determined by the speed of the sun gear member 22, the speed of the ring gear member 24, and the ring gear/sun gear tooth ratio of the planetary gearset 20. The ring gear member 34 and therefore output shaft 19 are driven at a speed determined by the speed of the sun gear member 32, the speed of the planet carrier assembly member 36, and the ring gear/sun gear tooth ratio of the planetary gearset 30. The numerical value of the third forward speed ratio is determined by the ring gear/sun gear tooth ratios of all three planetary gearsets 20, 30, and 40.

The fourth forward speed ratio is established with the engagement of the torque-transmitting mechanisms 50 and 52. This combination of engagements causes the planetary gearset 20, the planetary gearset 30, and therefore the output shaft 19 to rotate in unison with the input shaft 17. The fourth forward speed ratio is therefore a direct drive having a numerical of one.

The fifth forward speed ratio is established with the engagement of the torque-transmitting mechanisms 50 and 54. During the fifth forward speed ratio, the planet carrier assembly member 46, the sun gear member 32, and the ring gear member 34 are driven at a speed determined by the speed of the sun gear member 42 and the ring gear/sun gear tooth ratio of the planetary gearset 40. The ring gear member 34 and therefore output shaft 19 are driven at a speed determined by the speed of the sun gear member 32, the speed of the planet carrier assembly member 36, and the ring gear/sun gear tooth ratio of the planetary gearset 30. The numerical value of the fifth forward speed ratio is determined by the ring gear/sun gear tooth ratios of the planetary gearsets 30 and 40.

The sixth forward speed ratio is established with the engagement of the torque-transmitting mechanisms 50 and 56. During the sixth forward speed ratio, the ring gear member 34 and therefore output shaft 19 are driven at a speed determined by the speed of the planet carrier assembly member 36 and the ring gear/sun gear tooth ratio of the planetary gearset 30. The numerical value of the sixth forward speed ratio is determined by the ring gear/sun gear tooth ratio of the planetary gearset 30.

Figures 3, 4:
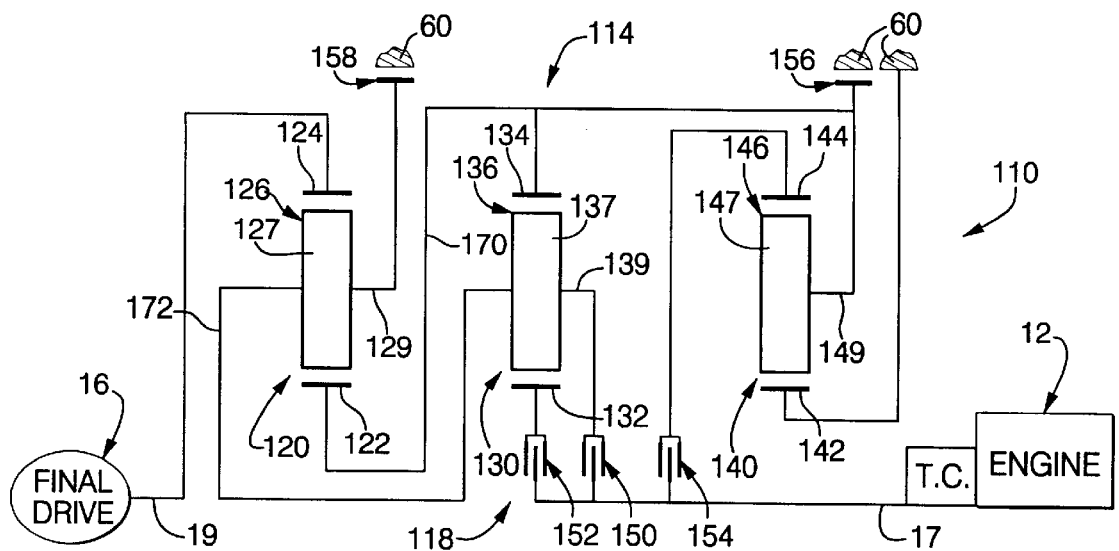
FIG. 3 is a schematic representation of a powertrain incorporating another embodiment of the present invention.
FIG. 4 is a truth table and chart depicting some of the operating characteristics of the embodiment shown in FIG. 3.

A powertrain 110, shown in FIG. 3, includes the engine and torque converter 12, a planetary transmission 114, and the final drive mechanism 16. The planetary transmission 114 includes the input shaft 17, a planetary gear arrangement 118, and the output shaft 19. The planetary gear arrangement 118 includes three planetary gearsets 120, 130, and 140, and five torque-transmitting mechanisms 150, 152, 154, 156, and 158. The torque-transmitting mechanisms 150, 152, and 154 are rotating type torque-transmitting mechanisms and the torque-transmitting mechanisms 156 and 158 are stationary type torque-transmitting mechanisms.

The planetary gearset 120 includes a sun gear member 122, a ring gear member 124, and a planet carrier assembly member 126. The planet carrier assembly member 126 includes a plurality of pinion gears 127 rotatably mounted on a planet carrier 129 and disposed in meshing relationship with both the sun gear member 122 and the ring gear member 124.

The planetary gearset 130 includes a sun gear member 132, a ring gear member 134, and a planet carrier assembly member 136. The planet carrier assembly member 136 includes a plurality of pinion gears 137 rotatably mounted on planet carrier 139 and disposed in meshing relationship with both the sun gear member 132 and the ring gear member 134.

The planetary gearset 140 includes a sun gear member 142, a ring gear member 144, and a planet carrier assembly member 146. The planet carrier assembly member 146 includes a plurality of pinion gears 147 rotatably mounted on a planet carrier 149 and disposed in meshing relationship with both the sun gear member 142 and the ring gear member 144.

The sun gear member 122, the ring gear member 134, and the planet carrier assembly member 146 are continuously interconnected through an interconnecting member 170 which is selectively connectible with the transmission housing 60 through the torque-transmitting mechanism 156. The planet carrier assembly member 126 and the planet carrier assembly member 136 are continuously interconnected by an interconnecting member 172 which is selectively connectible with the input shaft 17 through the torque-transmitting mechanism 150, and selectively connectible with the transmission housing 60 through the torque-transmitting mechanism 158. The sun gear member 142 is continuously connected with the transmission housing 60. The ring gear member 124 is continuously connected with the output shaft 19.

The input shaft 17 is selectively connectible with the sun gear member 132 through the torque-transmitting mechanism 152, and selectively connectible with the ring gear member 144 through the torque-transmitting mechanism 154. It will be noted that the sun gear member 132 and the ring gear member 144 are not otherwise continuously interconnected with members of the planetary transmission 114 except through the selectively engageable torque-transmitting mechanisms 152 and 154, respectively.

As seen in the truth table of FIG. 4, the torque-transmitting mechanisms are selectively engaged in combinations of two to provide six forward speed ratios and one reverse speed ratio. The truth table indicates that the single step forward interchanges as well as the double step forward interchanges are of the single transition variety. Also given in FIG. 4 is a numerical example of the speed ratios that are available with the planetary gear arrangement 118 when the ring gear/sun gear tooth ratios of the planetary gearsets 120, 130, and 140 have the values given as R1/S1, R2/S2, and R3/S3, respectively. FIG. 4 also describes the numerical value of ratio steps between adjacent forward speed ratios as well as between the reverse and first forward speed ratio when the given numerical speed values are employed.

The reverse speed ratio is established with the engagement of the torque-transmitting mechanisms 154 and 158. During the reverse speed ratio, the planet carrier assembly member 146, ring gear member 134, and sun gear member 122 are rotated at a speed determined by the speed of the ring gear member 144 and the ring gear/sun gear tooth ratio of the planetary gearset 140. The ring gear member 124 and the output shaft 19 are rotated at a speed determined by the speed of the sun gear member 122 and the ring gear/sun gear tooth ratio of the planetary gearset 120. The numerical value of the reverse speed ratio is determined by the ring gear/sun gear tooth ratios of the planetary gearsets 120 and 140.

The first forward speed ratio is established with the engagement of the torque-transmitting mechanisms 152 and 158. During the first forward speed ratio, the ring gear member 134 and sun gear member 122 are rotated at a speed determined by the speed of the sun gear member 132 and the ring gear/sun gear tooth ratio of the planetary gearset 130. The ring gear member 124 and output shaft 19 are rotated at a speed determined by the speed of the sun gear member 122 and the ring gear/sun gear tooth ratio of the planetary gearset 120. The numerical value of the first forward speed ratio is determined by the ring gear/sun gear tooth ratios of the planetary gearsets 120 and 130.

The second forward speed ratio is established with the engagement of the torque-transmitting mechanisms 152 and 156. During the second forward speed ratio, the planet carrier assembly members 136 and 126 are rotated at a speed determined by the speed of the sun gear member 132 and the ring gear/sun gear tooth ratio of the planetary gearset 130. The ring gear member 124 and output shaft 19 are rotated at a speed determined by the speed of the planet carrier assembly member 126 and the ring gear/sun gear tooth ratio of the planetary gearset 120. The numerical value of the second forward speed ratio is determined by the ring gear/sun gear tooth ratios of the planetary gearsets 120 and 130.

The third forward speed ratio is established with the engagement of the torque-transmitting mechanisms 152 and 154. During the third forward speed ratio, the planet carrier assembly member 146, the ring gear member 134, and the sun gear member 122 are driven at a speed determined by the speed of the ring gear member 144 and the ring gear/sun gear tooth ratio of the planetary gearset 140. The planet carrier assembly members 126 and 136 are rotated at a speed determined by the speed of the sun gear member 132, the speed of the ring gear member 134, and the ring gear/sun gear tooth ratio of the planetary gearset 130. The ring gear member 124 and output shaft 19 are rotated at a speed determined by the speed of the sun gear member 122, the speed of the planet carrier assembly member 126, and the ring gear/sun gear tooth ratio of the planetary gearset 120. The numerical value of the third forward speed ratio is determined by the ring gear/sun gear tooth ratios of all three planetary gearsets 120, 130, and 140.

The fourth forward speed ratio is established with the engagement of the torque-transmitting mechanisms 150 and 152. During the fourth forward speed ratio, the planetary gearsets 130 and 120, and therefore output shaft 19, are rotated in unison with the input shaft 17. The fourth forward speed ratio is a direct drive having a numerical value of one.

The fifth forward speed ratio is established with the engagement of the torque-transmitting mechanisms 150 and 154. During the fifth forward speed ratio, the planet carrier assembly member 146, the ring gear member 134, and sun gear member 122 are rotated at a speed determined by the speed of the ring gear member 144 and the ring gear/sun gear tooth ratio of the planetary gearset 140. The ring gear member 124 is rotated at a speed determined by the speed of the sun gear member 122, the speed of the planet carrier assembly member 126, and the ring gear/sun gear tooth ratio of the planetary gearset 120. The numerical value of the fifth forward speed ratio is determined by the ring gear/sun gear tooth ratios of the planetary gearsets 140 and 120.

The sixth forward speed ratio is established with the engagement of the torque-transmitting mechanisms 150 and 156. During the sixth forward speed ratio, the planet carrier assembly member 126 is rotated by the input shaft 17. The ring gear member 124 and output shaft 19 are rotated at a speed determined by the speed of the planet carrier assembly member 126 and the ring gear/sun gear tooth ratio of the planetary gearset 120. The numerical value of the sixth forward speed ratio is determined by the ring gear/sun gear tooth ratio of the planetary gearset 120.

Figures 5, 6:
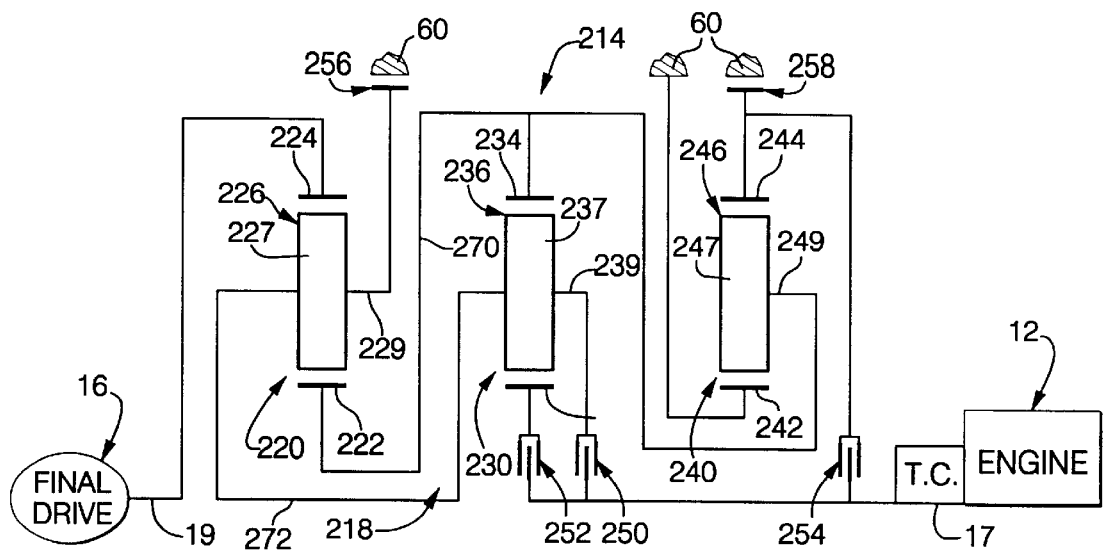
FIG. 5 is a schematic representation of a powertrain incorporating another embodiment of the present invention.
FIG. 6 is a truth table and chart depicting some of the operating characteristics of the embodiment shown in FIG. 5.

A powertrain 210, shown in FIG. 5, includes the engine and torque converter 12, a planetary transmission 214, and the final drive mechanism 16. The planetary transmission 214 includes the input shaft 17, a planetary gear arrangement 218, and the output shaft 19. The planetary gear arrangement 218 includes three planetary gearsets 220, 230, and 240, and five torque-transmitting mechanisms 250, 252, 254, 256, and 258. The torque-transmitting mechanisms 250, 252, and 254 are rotating type torque-transmitting mechanisms and the torque-transmitting mechanisms 256 and 258 are stationary type torque-transmitting mechanisms.

The planetary gearset 220 includes a sun gear member 222, a ring gear member 224, and a planet carrier assembly member 226. The planet carrier assembly member 226 includes a plurality of pinion gears 227 rotatably mounted on a planet carrier 229 and disposed in meshing relationship with both the sun gear member 222 and the ring gear member 224.

The planetary gearset 230 includes a sun gear member 232, a ring gear member 234, and a planet carrier assembly member 236. The planet carrier assembly member 236 includes a plurality of pinion gears 237 rotatably mounted on planet carrier 239 and disposed in meshing relationship with both the sun gear member 232 and the ring gear member 234.

The planetary gearset 240 includes a sun gear member 242, a ring gear member 244, and a planet carrier assembly member 246. The planet carrier assembly member 246 includes a plurality of pinion gears 247 rotatably mounted on a planet carrier 249 and disposed in meshing relationship with both the sun gear member 242 and the ring gear member 244.

The sun gear member 222, the ring gear member 234, and the planet carrier assembly member 246 are continuously interconnected by an interconnecting member 270. The planet carrier assembly member 226 and planet carrier assembly member 236 are continuously interconnected by an interconnecting member 272 that is selectively connectible with the input shaft 17 through the torque-transmitting mechanism 250, and selectively connectible with the transmission housing 60 through the torque-transmitting mechanism 256. The ring gear member 224 is continuously connected with the output shaft 19. The sun gear member 242 is continuously connected with the transmission housing 60. The input shaft 17 is selectively connectible with the sun gear member 232 through the torque-transmitting mechanism 252, and selectively connectible with ring gear member 244 through the torque-transmitting mechanism 254. The ring gear member 254 is also selectively connectible with the transmission housing 60 through the torque-transmitting mechanism 258.

Figures 15, 16:
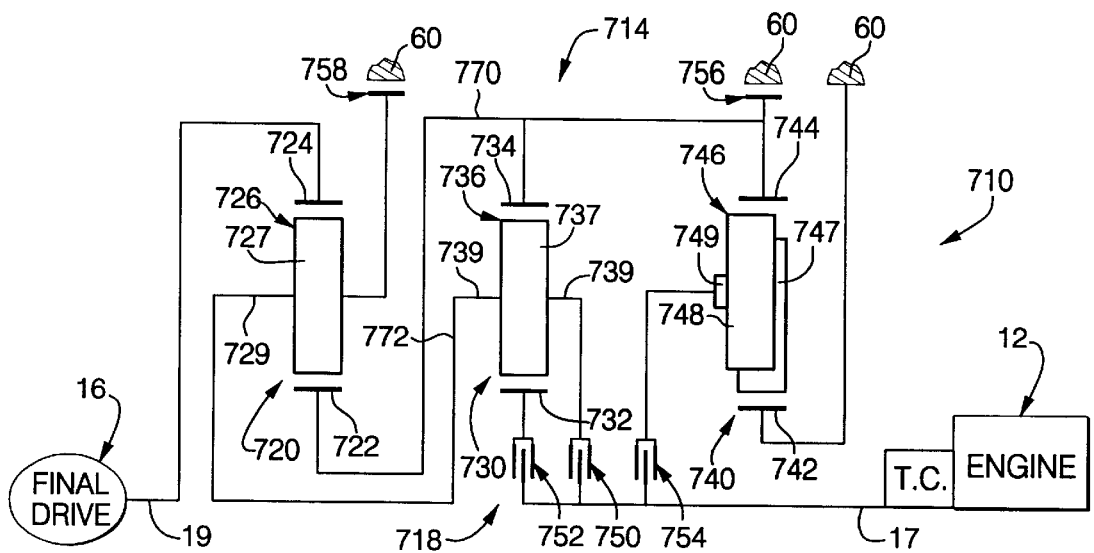
FIG. 15 is a schematic representation of a powertrain incorporating another embodiment of the present invention.
FIG. 16 is a truth table and chart depicting some of the operating characteristics of the embodiment shown in FIG. 15.

As seen in FIG. 6, the torque-transmitting mechanisms selectively engaged in combinations of two to provide six forward speed ratios and one reverse speed ratio between the input shaft 17 and the output shaft 19 through the planetary gear arrangement 218. The single step forward interchanges as well as the double step forward interchanges are each of the single transition variety. Also given in FIG. 16 is a numerical example of speed ratios that is attainable with the planetary gear arrangement 218 when the ring gear/sun gear tooth ratios of the planetary gearsets 220, 230, and 240 have the numerical values given as R1/S1, R2/S2, and R3/S3, respectively. Further information in FIG. 6 shows these numerical values for the ratio steps between adjacent forward speed ratios as well as between the reverse speed ratio and the first forward speed ratio.

The reverse speed ratio is established with the engagement of the torque-transmitting mechanisms 254 and 256. During the reverse speed ratio, the planet carrier assembly member 246 and the sun gear member 222 are rotated at a speed determined by the speed of the ring gear member 244 and the ring gear/sun gear tooth ratio of the planetary gearset 240. The ring gear member 224 and output shaft 19 are rotated at a speed determined by the speed of the sun gear member 222 and the ring gear/sun gear tooth ratio of the planetary gearset 220. The numerical value of the reverse speed ratio is determined by the ring gear/sun gear tooth ratios of the planetary gearsets 220 and 240.

The first forward speed ratio is established with the engagement of the torque-transmitting mechanisms 252 and 256. During the first forward speed ratio, the ring gear member 234 and sun gear member 222 are rotated at a speed determined by the speed of the sun gear member 232 and the ring gear/sun gear tooth ratio of the planetary gearset 230. The ring gear member 224 and output shaft 19 are rotated at a speed determined by the speed of the sun gear member 222 and the ring gear/sun gear tooth ratio of the planetary gearset 220. The numerical value of the first forward speed ratio is determined by the ring gear/sun gear tooth ratios of the planetary gearsets 220 and 230.

The second forward speed ratio is established with the engagement of the torque-transmitting mechanisms 252 and 258. During the second forward speed ratio, the planet carrier assembly members 226 and 236 are rotated at a speed determined by the speed of the of the sun gear member 232 and the ring gear/sun gear tooth ratio of the planetary gearset 230. The ring gear member 224 and output shaft 19 are rotated at a speed determined by the speed of the planet carrier assembly member 226 and the ring gear/sun gear tooth ratio of the planetary gearset 220. The numerical value of the second forward speed ratio is determined by the ring gear/sun gear tooth ratios of the planetary gearsets 220 and 230.

The third forward speed ratio is established with the engagement of the torque-transmitting mechanisms 252 and 254. During the third forward speed ratio, the planet carrier assembly member 246, the ring gear member 234, and the sun gear member 222 are rotated at a speed determined by the speed of the ring gear member 244 and the ring gear/sun gear tooth ratio of the planetary gearset 240. The planet carrier assembly member 236 and planet carrier assembly member 226 are rotated at a speed determined by the speed of the sun gear member 232, the speed of the ring gear member 234, and the ring gear/sun gear tooth ratio of the planetary gearset 230. The ring gear member 224 and output shaft 19 are rotated at a speed determined by the speed of the sun gear member 222, the speed of the planet carrier assembly member 226, and the ring gear/sun gear tooth ratio of the planetary gearset 220. The numerical value of the third forward speed ratio is determined by the ring gear/sun gear tooth ratios of all three planetary gearsets 220, 230, and 240.

The fourth forward speed ratio is established with the engagement of the torque-transmitting mechanisms 250 and 252. This combination of engagements causes the planetary gearsets 230 and 220, as well as output shaft 19, to rotate in unison with the input shaft 17 such that the fourth forward speed ratio is a direct drive having a numerical value of one.

The fifth forward speed ratio is established with the engagement of the torque-transmitting mechanisms 250 and 254. During the fifth forward speed ratio, the planet carrier assembly member 246, ring gear member 234, and the sun gear member 222 are rotated at a speed determined by the speed of the ring gear member 244 and the ring gear/sun gear tooth ratio of the planetary gearset 240. The ring gear member 224 and output shaft 19 are rotated at a speed determined by the speed of the planet carrier assembly member 226, the speed of the sun gear member 222, and the ring gear/sun gear tooth ratio of the planetary gearset 220. The numerical value of the fifth forward speed ratio is determined by the ring gear/sun gear tooth ratios of the planetary gearsets 220 and 240.

The sixth forward speed ratio is established with the engagement of the torque-transmitting mechanisms 250 and 258. During the sixth forward speed ratio, the planet carrier assembly member 226 is rotated by the input shaft 17. The ring gear member 224 and output shaft 19 are rotated at a speed determined by the speed of the planet carrier assembly member 226 and the ring gear/sun gear tooth ratio of the planetary gearset 220. The numerical value of the sixth forward speed ratio is determined by the ring gear/sun gear tooth ratio of the planetary gearset 220.

Figures 7, 8:
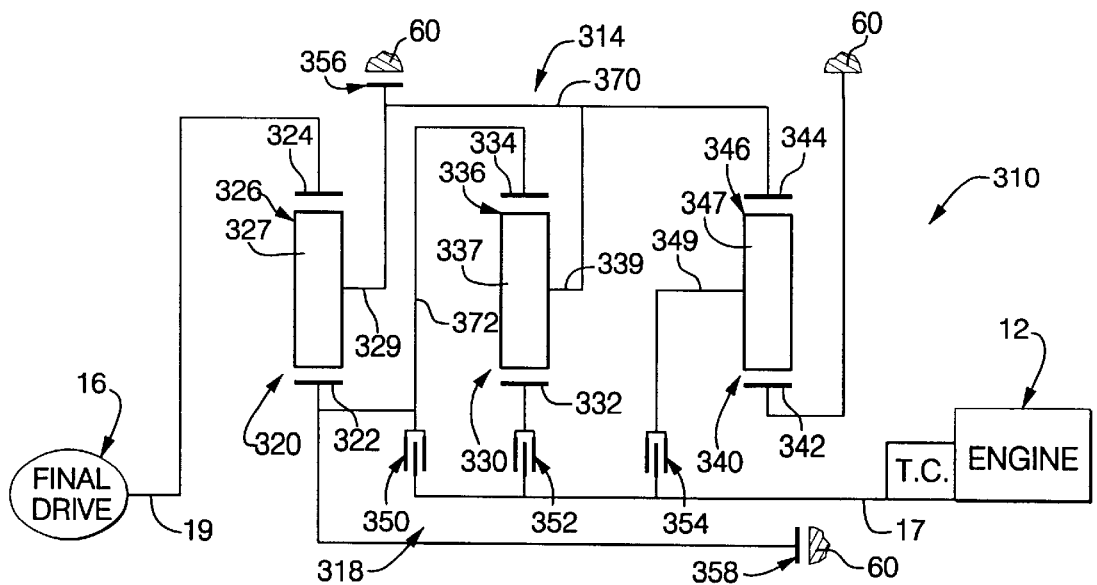
FIG. 7 is a schematic representation of a powertrain incorporating another embodiment of the present invention.
FIG. 8 is a truth table and chart depicting some of the operating characteristics of the embodiment shown in FIG. 7.

A powertrain 310, shown in FIG. 7, includes the engine and torque converter 12, a planetary transmission 314, and the final drive mechanism 16. The planetary transmission 314 includes the input shaft 17, a planetary gear arrangement 318, and the output shaft 19. The planetary gear arrangement 318 includes three planetary gearsets 320, 330, and 340, and five torque-transmitting mechanisms 350, 352, 354, 356, and 358. The torque-transmitting mechanisms 350, 352, and 354 are rotating type torque-transmitting mechanisms and the torque-transmitting mechanisms 356 and 358 are stationary type torque-transmitting mechanisms.

The planetary gearset 320 includes a sun gear member 322, a ring gear member 324, and a planet carrier assembly member 326. The planet carrier assembly member 326 includes a plurality of pinion gears 327 rotatably mounted on a planet carrier 329 and disposed in meshing relationship with both the sun gear member 322 and the ring gear member 324.

The planetary gearset 330 includes a sun gear member 332, a ring gear member 334, and a planet carrier assembly member 336. The planet carrier assembly member 336 includes a plurality of pinion gears 337 rotatably mounted on planet carrier 339 and disposed in meshing relationship with both the sun gear member 332 and the ring gear member 334.

The planetary gearset 340 includes a sun gear member 342, a ring gear member 344, and a planet carrier assembly member 346. The planet carrier assembly member 346 includes a plurality of pinion gears 347 rotatably mounted on a planet carrier 349 and disposed in meshing relationship with both the sun gear member 342 and the ring gear member 344.

The planet carrier assembly member 326, planet carrier assembly member 336, and the ring gear member 344 are continuously interconnected by an interconnecting member 370 which is selectively connectible with the transmission housing 60 through the torque-transmitting mechanism 356. The sun gear member 322 and ring gear member 334 are continuously interconnected by an interconnecting member 372, which is selectively connectible with the input shaft 17 through the torque-transmitting mechanism 350, and selectively connectible with the transmission housing 60 through the torque-transmitting mechanism 358. The sun gear member 342 is continuously connected with the transmission housing 60. The ring gear member 324 is continuously connected with the output shaft 19. The input shaft 17 is selectively connectible with the planet carrier assembly member 346 through the torque-transmitting mechanism 354, and with the sun gear member 332 through the torque-transmitting mechanism 352. The sun gear member 332 and planet carrier assembly member 346 are not otherwise continuously interconnected with other members of the planetary gearsets except through the selectively engageable torque-transmitting mechanisms 352 and 354, respectively.

As seen in FIG. 8, the torque-transmitting mechanisms are selectively engaged in combinations of two to establish six forward speed ratios and one reverse speed ratio between the input shaft 17 and the output shaft 19 through planetary gear arrangement 318. The truth table of FIG. 8 also provides a numerical example of the speed ratios that are available in the planetary gear arrangement 318 when the ring gear/sun gear tooth ratios of the planetary gearsets 320, 330, and 340 have the numerical values given as R1/S1, R2/S2, and R3/S3, respectively. The chart of FIG. 8 provides a numerical example of the ratio steps between adjacent forward speed ratios as well as between the reverse and first forward speed ratio. These numerical values are separated from the speed ratios given in the truth table.

The reverse speed ratio is established with the engagement of the torque-transmitting mechanisms 350 and 356. During the reverse speed ratio, the sun gear member 322 is driven by the input shaft 17. The planet carrier assembly member 326 is held stationary by the torque-transmitting mechanism 356, and the ring gear member 324 is driven at a speed determined by the speed of the sun gear member 322 and the ring gear/sun gear tooth ratio of the planetary gearset 320. The numerical value of the reverse speed ratio is determined by the ring gear/sun gear tooth ratio of the planetary gearset 320.

The first forward speed ratio is established with the engagement of the torque-transmitting mechanisms 352 and 356. During the first forward speed ratio, the ring gear member 334 and sun gear member 322 are rotated at a speed determined by the speed of the sun gear member 332 and the ring gear/sun gear tooth ratio of the planetary gearset 330. The ring gear member 324 and output shaft 19 are rotated at a speed determined by the speed of the sun gear member 322 and the ring gear/sun gear tooth ratio of the planetary gearset 320. The numerical value of the first forward speed ratio is determined by the ring gear/sun gear tooth ratios of the planetary gearset 320 and 330.

The second forward speed ratio is established with the engagement of the torque-transmitting mechanisms 352 and 358. During the second forward speed ratio, the planet carrier assembly member 336 and planet carrier assembly member 326 are rotated at a speed determined by the speed of the sun gear member 332 and the ring gear/sun gear tooth ratio of the planetary gearset 330. The ring gear member 324 and output shaft 19 are rotated at a speed determined by the speed of the planet carrier assembly member 326 and the ring gear/sun gear tooth ratio of the planetary gearset 320. The numerical value of the second forward speed ratio is determined by the ring gear/sun gear tooth ratios of the planetary gearsets 320 and 330.

The third forward speed ratio is established with the engagement of the torque-transmitting mechanisms 350 and 352. During the third forward speed ratio, the planetary gearsets 320 and 330, as well as output shaft 19, are driven in unison with the input shaft 17 such that the third forward speed ratio is a direct drive having a numerical value of one.

The fourth forward speed ratio is established with the engagement of the torque-transmitting mechanisms 352 and 354. During the fourth forward speed ratio, the ring gear member 344, the planet carrier assembly member 336, and the planet carrier assembly member 326 are rotated at a speed determined by the speed of the planet carrier assembly member 346 and the ring gear/sun gear tooth ratio of the planetary gearset 340. The ring gear member 334 and sun gear member 322 are rotated at a speed determined by the speed of the sun gear member 332, the speed of the planet carrier assembly member 336, and the ring gear/sun gear tooth ratio of the planetary gearset 330. The ring gear member 324 and output shaft 19 are rotated at a speed determined by the speed of the sun gear member 322, the speed of the planet carrier assembly member 326, and the ring gear/sun gear tooth ratio of the planetary gearset 320. The numerical value of the fourth forward speed ratio is determined by the ring gear/sun gear tooth ratios of the planetary gearsets 320, 330, and 340.

The fifth forward speed ratio is established with the engagement of the torque-transmitting mechanisms 350 and 354. During the fifth forward speed ratio, both the planet carrier assembly member 346 and the sun gear member 322 are driven directly by the input shaft 17. The ring gear member 344 and planet carrier assembly member 326 are rotated at a speed determined by the speed of the planet carrier assembly member 346 and the ring gear/sun gear tooth ratio of the planetary gearset 340. The ring gear member 324 and output shaft 19 are rotated at a speed determined by the speed of the sun gear member 322, the speed of the planet carrier assembly member 326, and the ring gear/sun gear tooth ratio of the planetary gearset 320. The numerical value of the fifth forward speed ratio is determined by the ring gear/sun gear tooth ratios of the planetary gearsets 320 and 340.

The sixth forward speed ratio is established with the engagement of the torque-transmitting mechanisms 354 and 358. During the sixth forward speed ratio, the ring gear member 344 and planet carrier assembly member 326 are rotated at a speed determined by the speed of the planet carrier assembly member 346 and the ring gear/sun gear tooth ratio of the planetary gearset 340. The ring gear member 324 and output shaft 19 are rotated at a speed determined by the speed of the planet carrier assembly member 326 and the ring gear/sun gear tooth ratio of the planetary gearset 320. The numerical value of the sixth forward speed ratio is determined by the ring gear/sun gear tooth ratios of the planetary gearsets 320 and 340.

Figures 9, 10:
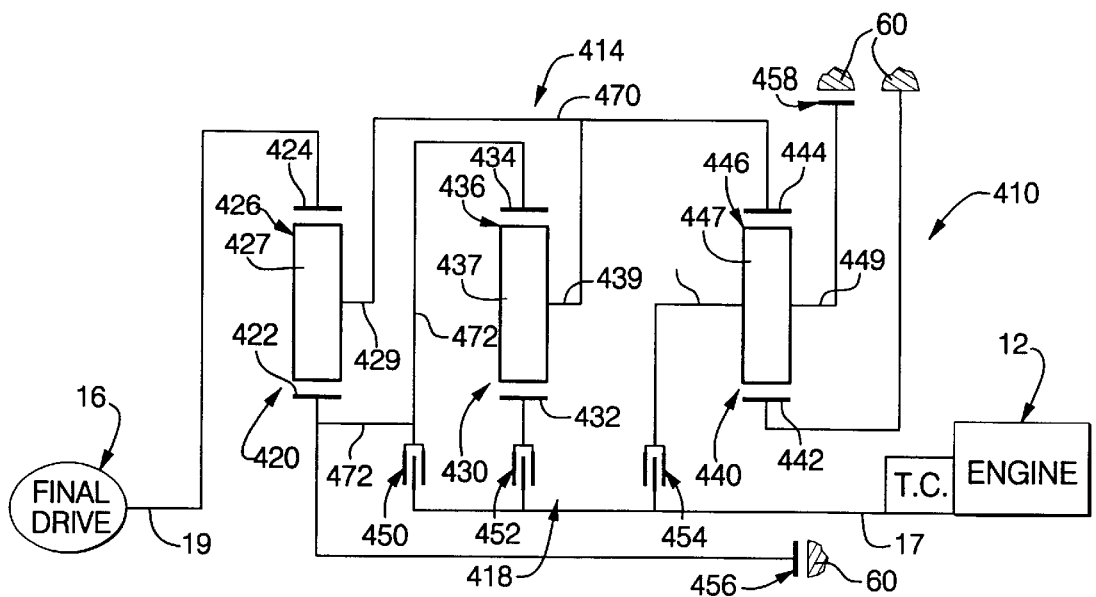
FIG. 9 is a schematic representation of a powertrain incorporating another embodiment of the present invention.
FIG. 10 is a truth table and chart depicting some of the operating characteristics of the embodiment shown in FIG. 9.

A powertrain 410, shown in FIG. 9, includes the engine and torque converter 12, a planetary transmission 414, and the final drive mechanism 16. The planetary transmission 414 includes the input shaft 17, a planetary gear arrangement 418, and the output shaft 19. The planetary gear arrangement 418 includes three planetary gearsets 420, 430, and 440, and five torque-transmitting mechanisms 450, 452, 454, 456, and 458. The torque-transmitting mechanisms 450, 452, and 454 are rotating type torque-transmitting mechanisms and the torque-transmitting mechanisms 456 and 458 are stationary type torque-transmitting mechanisms.

The planetary gearset 420 includes a sun gear member 422, a ring gear member 424, and a planet carrier assembly member 426. The planet carrier assembly member 426 includes a plurality of pinion gears 427 rotatably mounted on a planet carrier 429 and disposed in meshing relationship with both the sun gear member 422 and the ring gear member 424.

The planetary gearset 430 includes a sun gear member 432, a ring gear member 434, and a planet carrier assembly member 436. The planet carrier assembly member 436 includes a plurality of pinion gears 437 rotatably mounted on planet carrier 439 and disposed in meshing relationship with both the sun gear member 432 and the ring gear member 434.

The planetary gearset 440 includes a sun gear member 442, a ring gear member 444, and a planet carrier assembly member 446. The planet carrier assembly member 446 includes a plurality of pinion gears 447 rotatably mounted on a planet carrier 449 and disposed in meshing relationship with both the sun gear member 442 and the ring gear member 444.

The planet carrier assembly member 426, the planet carrier assembly member 436, and the ring gear member 444 are continuously interconnected by the interconnecting member 470. The sun gear member 422 and ring gear member 434 are continuously interconnected by an interconnecting member 472, which is selectively connectible with the input shaft 17 through the torque-transmitting mechanism 450, and selectively connectible with the transmission housing 60 through the torque-transmitting mechanism 456. The sun gear member 442 is continuously connected with the transmission housing 60 and the ring gear member 424 is continuously connected with the output shaft 19.

The input shaft 17 is selectively connectible with the sun gear member 432 through the torque-transmitting mechanism 452, and selectively connectible with the planet carrier assembly member 446 through the torque-transmitting mechanism 454. The planet carrier assembly member 446 is selectively connectible with the transmission housing 60 through the torque-transmitting mechanism 458. Both the sun gear member 432 and planet carrier assembly member 446 are not continuously interconnected with other members of the planetary gearsets except by way of the torque-transmitting mechanisms connected therewith.

The torque-transmitting mechanisms are engaged in combinations of two to establish six forward speed ratios and one reverse speed ratio between the input shaft 17 and the output shaft 19 as shown in the truth table of FIG. 10. Also described in the truth table is the numerical example of the speed ratios that are available in the planetary gear arrangement 418 when the numerical values of the ring gear/sun gear tooth ratios of the planetary gearsets 420, 430, and 440 are as given in R1/S1, R2/S2, and R3/S3, respectively. Also provided in FIG. 10 is the numerical value of the ratio steps between adjacent forward speed ratios and between the reverse and first forward speed ratio. It is also evident from the truth table, as with the other family members previously described, that each of the single step forward interchanges and the double step forward interchanges are of the single transition variety.

The reverse speed ratio is established with the engagement of the torque-transmitting mechanisms 450 and 458. During the reverse speed ratio, the sun gear member 422 is driven by the input shaft 17, and the planet carrier assembly member 426 is held stationary. The ring gear member 424 is rotated at a speed determined by the speed of the sun gear member 422 and the ring gear/sun gear tooth ratio of the planetary gearset 420. The numerical value of the reverse speed ratio is determined by the ring gear/sun gear tooth ratio of the planetary gearset 420.

The first forward speed ratio is established with the engagement of the torque-transmitting mechanisms 452 and 458. During the first forward speed ratio, the ring gear member 434 and sun gear member 422 are driven at a speed determined by the speed of the sun gear member 432 and the ring gear/sun gear tooth ratio of the planetary gearset 430. The ring gear member 424 and output shaft 19 are rotated at a speed determined by the speed of the sun gear member 422 and the ring gear/sun gear tooth ratio of the planetary gearset 420. The numerical value of the first forward speed ratio is determined by the ring gear/sun gear tooth ratios of the planetary gearsets 420 and 430.

The second forward speed ratio is established with the engagement of the torque-transmitting mechanisms 452 and 456. During the second forward speed ratio, the sun gear member 432 is driven by the input shaft 17. The planet carrier assembly member 436 and planet carrier assembly member 426 are rotated at a speed determined by the speed of the sun gear member 432 and the ring gear/sun gear tooth ratio of the planetary gearset 430. The ring gear member 424 and output shaft 19 are rotated at a speed determined by the speed of the planet carrier assembly member 426 and the ring gear/sun gear tooth ratio of the planetary gearset 420. The numerical value of the second forward speed ratio is determined by the ring gear/sun gear tooth ratios of the planetary gearsets 420 and 430.

The third forward speed ratio is established with the engagement of the torque-transmitting mechanisms 450 and 452. This combination of engagements causes the planetary gearsets 420 and 430 as well as output shaft 19 to rotate in unison with the input shaft 17 thereby creating a 1:1 speed ratio or direct drive.

The fourth forward speed ratio is established with the engagement of the torque-transmitting mechanisms 452 and 454. During the fourth forward speed ratio, the ring gear member 444, planet carrier assembly member 436, and planet carrier assembly member 426 are rotated at a speed determined by the speed of the planet carrier assembly member 446 and the ring gear/sun gear tooth ratio of the planetary gearset 440. The ring gear member 434 and sun gear member 422 are rotated at a speed determined by the speed of the of the sun gear member 432, the speed of the planet carrier assembly member 436, and the ring gear/sun gear tooth ratio of the planetary gearset 430. The ring gear member 424 and therefore output shaft 19 are rotated at a speed determined by the speed of the sun gear member 422, the speed of the planet carrier assembly member 426, and the ring gear/sun gear tooth ratio of the planetary gearset 420. The numerical value of the fourth forward speed ratio is determined by the ring gear/sun gear tooth ratios of all three planetary gearsets 420, 430, and 440.

The fifth forward speed ratio is established with the engagement of the torque-transmitting mechanisms 450 and 454. During the fifth forward speed ratio, the ring gear member 444, the planet carrier assembly member 436, and the planet carrier assembly member 426 are driven at a speed determined by the speed of the planet carrier assembly member 446 and the ring gear/sun gear tooth ratio of the planetary gearset 440. The ring gear member 424 and therefore output shaft 19 are rotated at a speed determined by the speed of the sun gear member 422, the speed of the planet carrier assembly member 426, and the ring gear/sun gear tooth ratio of the planetary gearset 420. The numerical value of the fifth forward speed ratio is determined by the ring gear/sun gear tooth ratios of the planetary gearsets 420 and 440.

The sixth forward speed ratio is established with the engagement of the torque-transmitting mechanisms 454 and 456. During the sixth forward speed ratio, the ring gear member 444, planet carrier assembly member 436, and planet carrier assembly member 426 are driven at a speed determined by the speed of the planet carrier assembly member 446 and the ring gear/sun gear tooth ratio of the planetary gearset 440. The ring gear member 424 and output shaft 19 are rotated at a speed determined by the speed of the planet carrier assembly member 426 and the ring gear/sun gear tooth ratio of the planetary gearset 420. The numerical value of the sixth forward speed ratio is determined by the ring gear/sun gear tooth ratios of the planetary gearsets 420 and 440.

Figures 11, 12:
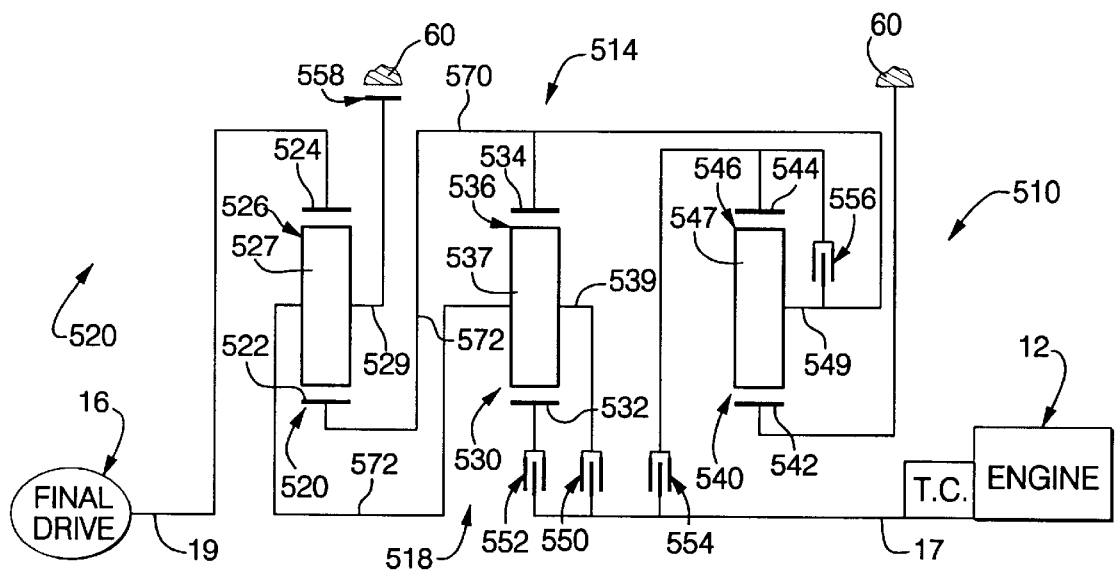
FIG. 11 is a schematic representation of a powertrain incorporating another embodiment of the present invention.
FIG. 12 is a truth table and chart depicting some of the operating characteristics of the embodiment shown in FIG. 11.

A powertrain 510, shown in FIG. 11, includes the engine and torque converter 12, a planetary transmission 514, and the final drive mechanism 16. The planetary transmission 514 includes the input shaft 17, a planetary gear arrangement 518, and the output shaft 19. The planetary gear arrangement 518 includes three planetary gearsets 520, 530, and 540, and five torque-transmitting mechanisms 550, 552, 554, 556, and 558. The torque-transmitting mechanisms 550, 552, 554, and 556 are rotating type torque-transmitting mechanisms and the torque-transmitting mechanism 558 is a stationary type torque-transmitting mechanism.

The planetary gearset 520 includes a sun gear member 522, a ring gear member 524, and a planet carrier assembly member 526. The planet carrier assembly member 526 includes a plurality of pinion gears 527 rotatably mounted on a planet carrier 529 and disposed in meshing relationship with both the sun gear member 522 and the ring gear member 524.

The planetary gearset 530 includes a sun gear member 532, a ring gear member 534, and a planet carrier assembly member 536. The planet carrier assembly member 536 includes a plurality of pinion gears 537 rotatably mounted on planet carrier 539 and disposed in meshing relationship with both the sun gear member 532 and the ring gear member 534.

The planetary gearset 540 includes a sun gear member 542, a ring gear member 544, and a planet carrier assembly member 546. The planet carrier assembly member 546 includes a plurality of pinion gears 547 rotatably mounted on a planet carrier 549 and disposed in meshing relationship with both the sun gear member 542 and the ring gear member 544.

The sun gear member 522, the ring gear member 534, and the planet carrier assembly member 546 are continuously interconnected by an interconnecting member 570. The planet carrier assembly member 526 and planet carrier assembly member 536 are continuously interconnected by an interconnecting member 572. The sun gear member 542 is continuously connected with the transmission housing 60. The ring gear member 524 is continuously connected with the output shaft 19.

The input shaft 17 is selectively connectible with the interconnecting member 572 through the torque-transmitting mechanism 550, selectively connectible with the sun gear member 532 through the torque-transmitting mechanism 552, and selectively connectible with the ring gear member 544 through the torque-transmitting mechanism 554. The ring gear member 544 is selectively connectible with the interconnecting member 570 through the torque-transmitting mechanism 556. The interconnecting member 572 is selectively connectible with ground or the transmission housing 60 through the torque-transmitting mechanism 558. It should be noted that the torque-transmitting mechanism 556 interconnects the ring gear member 544 and planet carrier assembly member 546 such that the planetary gearset 540 will be held stationary due to the fact that the sun gear member 542 is held stationary. In this arrangement, the torque-transmitting mechanism 556 essentially operates as a brake and holds the interconnecting member 570 stationary.

The torque-transmitting mechanisms are selectively engaged in combinations of two to establish six forward speed ratios and one reverse speed ratio as shown in the truth table of FIG. 12. Also given in FIG. 12 is a numerical example of the speed ratios that are available with the planetary gear arrangement 518 when the ring gear/sun gear tooth ratios of the planetary gearsets 520, 530, and 540 have these values given as R1/S1, R2/S2, and R3/S3, respectively. FIG. 12 also provides an example of the ratio steps available between adjacent forward speed ratios as well as between the reverse and first forward speed ratio when the numerical speed ratios of the truth table are employed. The truth table further indicates that each of the single step forward interchanges as well as the double step forward interchanges are of the single transition variety.

The reverse speed ratio is established with the engagement of the torque-transmitting mechanisms 554 and 558. During the reverse speed ratio, the planet carrier assembly member 546, the ring gear member 534, and the sun gear member 522 are rotated at a speed determined by the speed of the ring gear member 544 and the ring gear/sun gear tooth ratio of the planetary gearset 540. The ring gear member 524 and therefore output shaft 19 are rotated at a speed determined by the speed of the sun gear member 522 and the ring gear/sun gear tooth ratio of the planetary gearset 520. The numerical value of the reverse speed ratio is determined by the ring gear/sun gear tooth ratios of the planetary gearsets 540 and 520.

The first forward speed ratio is established with the engagement of the torque-transmitting mechanisms 552 and 558. During the first forward speed ratio, the ring gear member 534 and sun gear member 522 are rotated at a speed determined by the speed of the sun gear member 532 and the ring gear/sun gear tooth ratio of the planetary gearset 530. The ring gear member 524 and output shaft 19 are rotated at a speed determined by the speed of the sun gear member 522 and the ring gear/sun gear tooth ratio of the planetary gearset 520. The numerical value of the first forward speed ratio is determined by the ring gear/sun gear tooth ratios of the planetary gearsets 520 and 530.

The second forward speed ratio is established with the engagement of the torque-transmitting mechanisms 552 and 556. As previously mentioned, the torque-transmitting mechanism 556 is effective to hold the interconnecting member 570 stationary. The planet carrier assembly member 536 and planet carrier assembly member 526 are rotated at a speed determined by the speed of the sun gear member 532 and the ring gear/sun gear tooth ratio of the planetary gearset 530. The ring gear member 524 and output shaft 19 are rotated at a speed determined by the speed of the sun gear member 522 and the ring gear/sun gear tooth ratio of the planetary gearset 520. The numerical value of the second forward speed ratio is determined by the ring gear/sun gear tooth ratios of the planetary gearsets 520 and 530.

The third forward speed ratio is established with the engagement of the torque-transmitting mechanisms 552 and 554. During the third forward speed ratio, the ring gear member 544 and the sun gear member 532 are driven by the input shaft 17. The planet carrier assembly member 546, the ring gear member 534, and the sun gear member 522 are rotated at a speed determined by the speed of the ring gear member 544 and the ring gear/sun gear tooth ratio of the planetary gearset 540. The planet carrier assembly member 536 and planet carrier assembly member 526 are rotated at a speed determined by the speed of the sun gear member 532, the speed of the ring gear member 534 and the ring gear/sun gear tooth ratio of the planetary gearset 530. The ring gear member 524 and output shaft 19 are rotated at a speed determined by the speed of the sun gear member 522, the speed of the planet carrier assembly member 526, and the ring gear/sun gear tooth ratio of the planetary gearset 520. The numerical value of the third forward speed ratio is determined by the ring gear/sun gear tooth ratios of all three planetary gearsets 520, 530, and 540.

The fourth forward speed ratio is established with the engagement of the torque-transmitting mechanisms 550 and 552. This combination of engagements causes the planetary gearset 530, the planetary gearset 520, and the output shaft 19 to rotate as a single unit. The speed of these units is equal to the speed of the input shaft 17 such that the fourth forward speed ratio is a direct drive having a 1:1 ratio.

The fifth forward speed ratio is established with the engagement of the torque-transmitting mechanisms 550 and 554. During the fifth forward speed ratio, the planet carrier assembly member 546, the ring gear member 534, and the sun gear member 522 are rotated at a speed determined by the speed of the ring gear member 544 and the ring gear/sun gear tooth ratio of the planetary gearset 540. The ring gear member 524 and therefore output shaft 19 are rotated at a speed determined by the speed of the planet carrier assembly member 526, the speed of the sun gear member 522, and the ring gear/sun gear tooth ratio of the planetary gearset 520. The numerical value of the fifth forward speed ratio is determined by the ring gear/sun gear tooth ratios of the planetary gearsets 520 and 540.

The sixth forward speed ratio is established with the engagement of the torque-transmitting mechanisms 550 and 556. During the sixth forward speed ratio, the ring gear member 524 and therefore output shaft 19 are driven at a speed determined by the speed of the planet carrier assembly member 526 and the ring gear/sun gear tooth ratio of the planetary gearset 520. The numerical value of the sixth forward speed ratio is determined by the ring gear/sun gear tooth ratio of the planetary gearset 520.

Figures 13, 14:
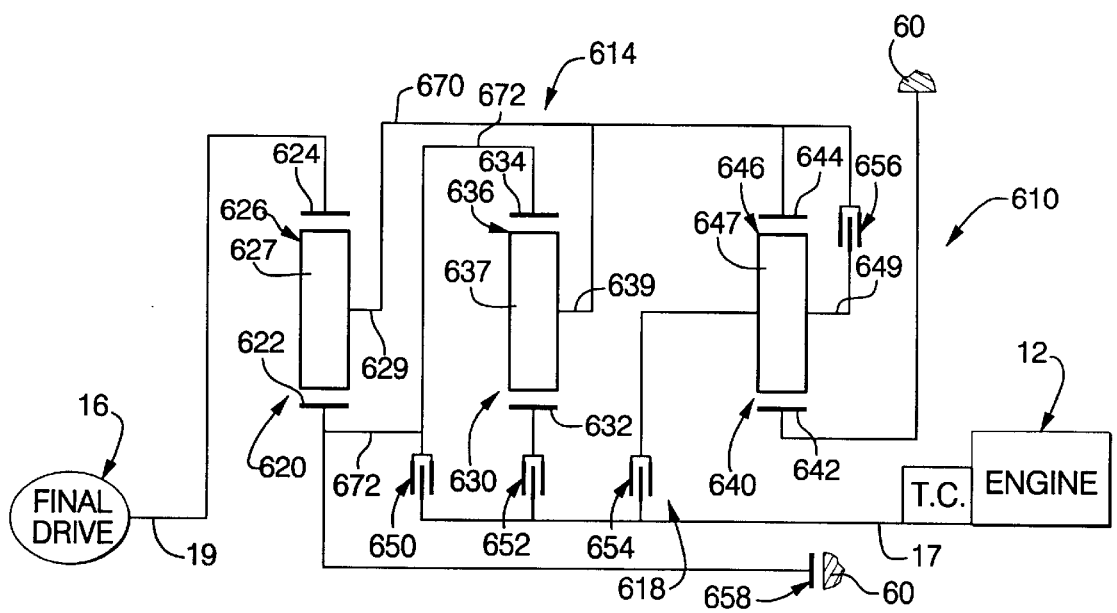
FIG. 13 is a schematic representation of a powertrain incorporating another embodiment of the present invention.
FIG. 14 is a truth table and chart depicting some of the operating characteristics of the embodiment shown in FIG. 13.

A powertrain 610, shown in FIG. 13, includes the engine and torque converter 12, a planetary transmission 614, and the final drive mechanism 16. The planetary transmission 614 includes the input shaft 17, a planetary gear arrangement 618, and the output shaft 19. The planetary gear arrangement 618 includes three planetary gearsets 620, 630, and 640, and five torque-transmitting mechanisms 650, 652, 654, 656, and 658. The torque-transmitting mechanisms 650, 652, 654, and 656 are rotating type torque-transmitting mechanisms and the torque-transmitting mechanism 658 is a stationary type torque-transmitting mechanism.

The planetary gearset 620 includes a sun gear member 622, a ring gear member 624, and a planet carrier assembly member 626. The planet carrier assembly member 626 includes a plurality of pinion gears 627 rotatably mounted on a planet carrier 629 and disposed in meshing relationship with both the sun gear member 622 and the ring gear member 624.

The planetary gearset 630 includes a sun gear member 632, a ring gear member 634, and a planet carrier assembly member 636. The planet carrier assembly member 636 includes a plurality of pinion gears 637 rotatably mounted on planet carrier 639 and disposed in meshing relationship with both the sun gear member 632 and the ring gear member 634.

The planetary gearset 640 includes a sun gear member 642, a ring gear member 644, and a planet carrier assembly member 646. The planet carrier assembly member 646 includes a plurality of pinion gears 647 rotatably mounted on a planet carrier 649 and disposed in meshing relationship with both the sun gear member 642 and the ring gear member 644.

The planet carrier assembly member 626, the planet carrier assembly member 636, and the ring gear member 644 are continuously interconnected by an interconnecting member 670. The sun gear member 622 and the ring gear member 634 are continuously interconnected by an interconnecting member 672. The sun gear member 642 is continuously connected with the transmission housing 60. The output shaft 19 is continuously connected with the ring gear member 624.

The input shaft 17 is selectively connectible with the interconnecting member 672 through the torque-transmitting mechanism 650, selectively connectible with the sun gear member 632 through the torque-transmitting mechanism 652, and selectively connectible with the planet carrier assembly member 646 through the torque-transmitting mechanism 654. The planet carrier assembly member 654 is selectively connectible with the interconnecting member 670. As with the previous family member, the engagement of the torque-transmitting mechanism 656 will hold the planetary gearset 640 as well as the interconnecting member 670 stationary. The interconnecting member 672 is selectively connectible with the transmission housing 60 through the torque-transmitting mechanism 658.

As seen in the truth table of FIG. 14, the torque-transmitting mechanisms are selectively engaged in combinations of two to provide six forward speed ratios and one reverse speed ratio through the planetary gear arrangement 618 between the input shaft 17 and the output shaft 19. A numerical example of available speed ratios with the planetary gear arrangement 618 are given in FIG. 14. These numerical values are determined utilizing the ring gear/sun gear tooth ratios of the planetary gearsets 620, 630, and 640. These numerical values are determined when values of the ring gear/sun gear tooth ratios of the planetary gearsets 620, 630, and 640 are equal to R1/S1, R2/S2, and R3/S3, respectively. Also given in FIG. 14 is a chart of the ratio steps between adjacent forward speed ratios as well as between the reverse and first forward speed ratio. A review of the truth table of FIG. 14 will show that each of the single step forward ratio interchanges as well as the double step forward ratio interchanges are of the single transition variety.

The reverse speed ratio is established with the engagement of the torque-transmitting mechanisms 650 and 656. This combination of engagements will hold the planet carrier assembly member 626 stationary and connect the sun gear member 622 with the input shaft 17. The ring gear member 624 is rotated at a speed determined by the speed of the sun gear member 622 and the ring gear/sun gear tooth ratio of the planetary gearset 620. The numerical of the reverse speed ratio is determined by the ring gear/sun gear tooth ratio of the planetary gearset 620.

The first forward speed ratio is established with the engagement of the torque-transmitting mechanisms 652 and 656. During the first forward speed ratio, the ring gear member 634 and sun gear member 622 are rotated at a speed determined by the speed of the sun gear member 632 and the ring gear/sun gear tooth ratio of the planetary gearset 630. The ring gear member 624 and output shaft 19 are rotated at a speed determined by the speed of the sun gear member 622 and the ring gear/sun gear tooth ratio of the planetary gearset 620. The numerical value of the first forward speed ratio is determined by the ring gear/sun gear tooth ratios of the planetary gearsets 620 and 630.

The second forward speed ratio is established with the engagement of the torque-transmitting mechanisms 652 and 658. During the second forward speed ratio, the planet carrier assembly member 636 and planet carrier assembly member 626 are rotated at a speed determined by the speed of the sun gear member 632 and the ring gear/sun gear tooth ratio of the planetary gearset 630. The ring gear member 624 and output shaft 19 are rotated at a speed determined by the speed of the planet carrier assembly member 626 and the ring gear/sun gear tooth ratio of the planetary gearset 620. The numerical value of the second forward speed ratio is determined by the ring gear/sun gear tooth ratios of the planetary gearsets 620 and 630.

The third forward speed ratio is established with the engagement of the torque-transmitting mechanisms 650 and 652. This combination of engagements will cause the planetary gearset 630, the planetary gearset 620, and the output shaft 19 to rotate as a single unit and in unison with the input shaft 17 thereby creating a direct drive having a 1:1 ratio.

The fourth forward speed ratio is established with the engagement of the torque-transmitting mechanisms 652 and 654. During the fourth forward speed ratio, the ring gear member 644, the planet carrier assembly member 636, and the planet carrier assembly member 626 are rotated at a speed determined by the speed of the planet carrier assembly member 646 and the ring gear/sun gear tooth ratio of the planetary gearset 640. The ring gear member 634 and sun gear member 622 are rotated at a speed determined by the speed of the sun gear member 632, the speed of the planet carrier assembly member 636, and the ring gear/sun gear tooth ratio of the planetary gearset 630. The ring gear member 624 and therefore output shaft 19 are rotated at a speed determined by the speed of the sun gear member 622, the speed of the planet carrier assembly member 626, and the ring gear/sun gear tooth ratio of the planetary gearset 620. The numerical value of the fourth forward speed ratio is determined by the ring gear/sun gear tooth ratios of all three planetary gearsets 620, 630, and 640.

The fifth forward speed ratio is established with the engagement of the torque-transmitting mechanisms 650 and 654. During the fifth forward speed ratio, the ring gear member 644 and planet carrier assembly member 626 are rotated at a speed determined by the speed of the planet carrier assembly member 646 and the ring gear/sun gear tooth ratio of planetary gearset 640. The ring gear member 624 and output shaft 19 are rotated at a speed determined by the speed of the planet carrier assembly member 626, the speed of the sun gear member 622, and the ring gear/sun gear tooth ratio of the planetary gearset 620. The numerical value of the fifth forward speed ratio is determined by the ring gear/sun gear tooth ratios of the planetary gearsets 620 and 640.

The sixth forward speed ratio is established with the engagement of the torque-transmitting mechanisms 654 and 658. During the sixth forward speed ratio, the ring gear member 644 and planet carrier assembly member 626 are rotated at a speed determined by the speed of the planet carrier assembly member 646 and the ring gear/sun gear tooth ratio of the planetary gearset 640. The ring gear member 624 and therefore output shaft 19 are rotated at a speed determined by the speed of the planet carrier assembly member 626 and the ring gear/sun gear tooth ratio of the planetary gearset 620. The numerical value of the sixth forward speed ratio is determined by the ring gear/sun gear tooth ratios of the planetary gearsets 620 and 640.

A powertrain 710, shown in FIG. 15, includes the engine and torque converter 12, a planetary transmission 714, and the final drive mechanism 16. The planetary transmission 714 includes the input shaft 17, a planetary gear arrangement 718, and the output shaft 19. The planetary gear arrangement 718 includes three planetary gearsets 720, 730, and 740, and five torque-transmitting mechanisms 750, 752, 754, 756, and 758. The torque-transmitting mechanisms 750, 752, 754 are rotating type torque-transmitting mechanisms and the torque-transmitting mechanisms 756 and 758 are stationary type torque-transmitting mechanisms.

The planetary gearset 720 includes a sun gear member 722, a ring gear member 724, and a planet carrier assembly member 726. The planet carrier assembly member 726 includes a plurality of pinion gears 727 rotatably mounted on a planet carrier 729 and disposed in meshing relationship with both the sun gear member 722 and the ring gear member 724.

The planetary gearset 730 includes a sun gear member 732, a ring gear member 734, and a planet carrier assembly member 736. The planet carrier assembly member 736 includes a plurality of pinion gears 737 rotatably mounted on planet carrier 739 and disposed in meshing relationship with both the sun gear member 732 and the ring gear member 734.

The planetary gearset 740 includes a sun gear member 742, a ring gear member 744, and a planet carrier assembly member 746. The planet carrier assembly member 746 includes a plurality of pairs of intermeshing pinion gears 747 and 748 that are rotatably mounted on a planet carrier 749 and disposed in meshing relationship with the sun gear member 742 and the ring gear member 744, respectively. The planetary gearset 740 is an example of a double pinion planetary gearset.

The sun gear member 722, the ring gear member 734, and the ring gear member 744 are continuously interconnected by an interconnecting member 770. The planet carrier assembly member 726 and the planet carrier assembly member 736 are continuously interconnected by an interconnecting member 772. The sun gear member 742 is continuously connected with the transmission housing 60. The ring gear member 724 is continuously connected with the output shaft 19.

The input shaft 17 is selectively connectible with the interconnecting member 772 through the torque-transmitting mechanism 750, selectively connectible with the sun gear member 732 through the torque-transmitting mechanism 752, and selectively connectible with the planet carrier assembly member 746 through the torque-transmitting mechanism 754. The interconnecting member 770 is selectively connectible with the transmission housing 60 through the torque-transmitting mechanism 756. The interconnecting member 772 is selectively connectible with the transmission housing 60 through the torque-transmitting mechanism 758. As with other family members, two of the members in this family; namely, the sun gear member 732 and planet carrier assembly member 746 are not continuously connected with other members of the planetary gear arrangement 718 and are only interconnectible therewith through the respective torque-transmitting mechanisms 752 and 754.

As seen in truth table of FIG. 16, the torque-transmitting mechanisms are selectively engaged in combinations of two to provide six forward speed ratios and one reverse speed ratio through the planetary gear arrangement 718 between the input shaft 17 and the output shaft 19. As noted therein, the single step forward interchanges as well as the double step forward interchanges are all of the single transition variety. Also given in the truth table is a numerical example of the ring gear/sun gear tooth ratios that can be obtained in the planetary gear arrangement 718 and the ring gear/sun gear tooth ratio values of the planetary gearsets 720, 730, and 740 are as given as R1/S1, R2/S2, and R3/S3, respectively. Also seen in FIG. 16 is a chart of ratio steps between adjacent forward speed ratios and between the reverse and first forward speed ratio. As previously mentioned with other family members, this numerical value is determined from the numerical value of the speed ratios given in the truth table.

The reverse speed ratio is established with the engagement of the torque-transmitting mechanisms 754 and 758. During the reverse speed ratio, the ring gear member 744, the ring gear member 734, and sun gear member 722 are rotated at a speed determined by the speed of the planet carrier assembly member 746 and the ring gear/sun gear tooth ratio of the planetary gearset 740. The ring gear member 724 and output shaft 19 are rotated at a speed determined by the speed of the sun gear member 722 and the ring gear/sun gear tooth ratio of the planetary gearset 720. The numerical value of the reverse speed ratio is determined by the ring gear/sun gear tooth ratios of the planetary gearsets 720 and 740.

The first forward speed ratio is established with the engagement of the torque-transmitting mechanisms 752 and 758. During the first forward speed ratio, the ring gear member 734 and sun gear member 722 are rotated at a speed determined by the speed of the sun gear member 732 and the ring gear/sun gear tooth ratio of the planetary gearset 730. The ring gear member 724 and output shaft 19 are rotated at a speed determined by the speed of the sun gear member 722 and the ring gear/sun gear tooth ratio of the planetary gearset 720. The numerical value of the first forward speed ratio is determined by the ring gear/sun gear tooth ratios of the planetary gearsets 730 and 720.

The second forward speed ratio is established with the engagement of the torque-transmitting mechanisms 752 and 756. During the second forward speed ratio, the planet carrier assembly members 736 and 726 are rotated at a speed determined by the speed of the sun gear member 732 and the ring gear/sun gear tooth ratio of the planetary gearset 730. The ring gear member 724 and output shaft 19 are rotated at a speed determined by the speed of the planet carrier assembly member 726 and the ring gear/sun gear tooth ratio of the planetary gearset 720. The numerical value of the second forward speed ratio is determined by the ring gear/sun gear tooth ratios of the planetary gearsets 730 and 720.

The third forward speed ratio is established with the engagement of the torque-transmitting mechanisms 752 and 754. During the third forward speed ratio, the ring gear member 744, the ring gear member 734, and the sun gear member 722 are rotated at a speed determined by the speed of the planet carrier assembly member 746 and the ring gear/sun gear tooth ratio of the planetary gearset 740. The planet carrier assembly member 736 and planet carrier assembly member 726 are rotated at a speed determined by the speed of the sun gear member 732, the speed of the ring gear member 734, and the ring gear/sun gear tooth ratio of the planetary gearset 730. The ring gear member 724 and output shaft 19 are rotated at a speed determined by the speed of the sun gear member 722, the speed of the planet carrier assembly member 726, and the ring gear/sun gear tooth ratio of the planetary gearset 720. The numerical value of the third forward speed ratio is determined by the ring gear/sun gear tooth ratios of all three planetary gearsets 720, 730, and 740.

The fourth forward speed ratio is established with the engagement of the torque-transmitting mechanisms 750 and 752. This combination of engagements causes the planetary gearset 730, the planetary gearset 720, and the output shaft 19 to rotate in unison with the input shaft 17. Thus, the fourth forward speed ratio is a direct drive having a numerical value of one.

The fifth forward speed ratio is established with the engagement of the torque-transmitting mechanisms 750 and 754. During the fifth forward speed ratio, the ring gear member 744, the ring gear member 734, and the sun gear member 722 are rotated at a speed determined by the speed of the planet carrier assembly member 746 and the ring gear/sun gear tooth ratio of the planetary gearset 740. The ring gear member 724 and output shaft 19 are rotated at a speed determined by the speed of the sun gear member 722, the speed of the planet carrier assembly member 726, and the ring gear/sun gear tooth ratio of the planetary gearset 720. The numerical value of the fifth forward speed ratio is determined by the ring gear/sun gear tooth ratios of the planetary gearsets 720 and 740.

The sixth forward speed ratio is established with the engagement of the torque-transmitting mechanisms 750 and 756. During the sixth forward speed ratio, the planet carrier assembly member 726 is driven by the input shaft 17. The ring gear member 724 and output shaft 19 are rotated at a speed determined by the speed of the planet carrier assembly member 726 and the ring gear/sun gear tooth ratio of the planetary gearset 720. The numerical value of the sixth forward speed ratio is determined by the ring gear/sun gear tooth ratio of the planetary gearset 720.

Figures 17, 18:
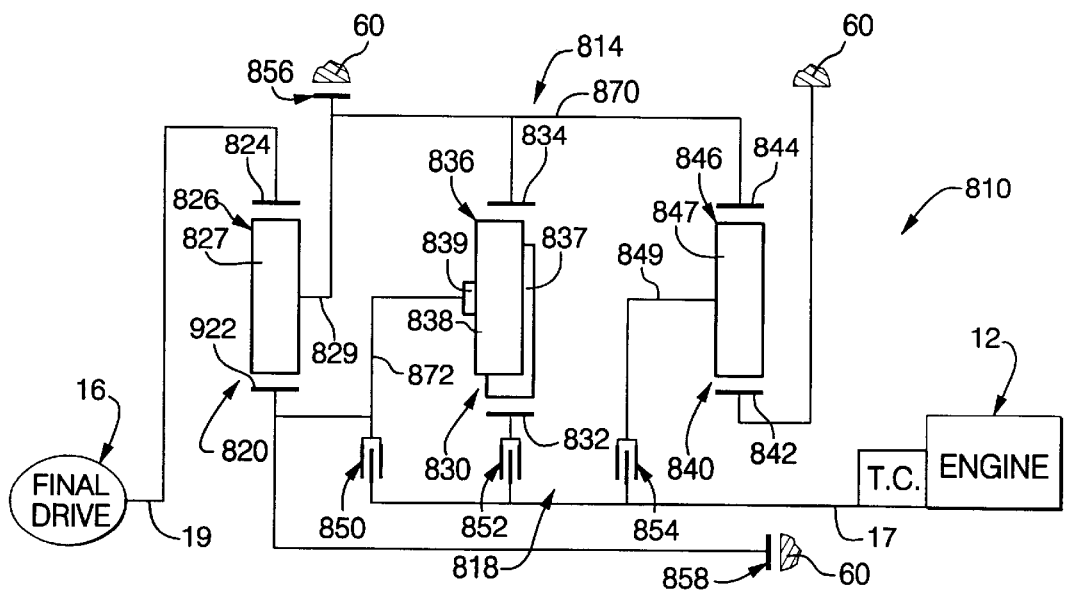
FIG. 17 is a schematic representation of a powertrain incorporating another embodiment of the present invention.
FIG. 18 is a truth table and chart depicting some of the operating characteristics of the embodiment shown in FIG. 17.

A powertrain 810, shown in FIG. 17, includes the engine and torque converter 12, a planetary transmission 814, and the final drive mechanism 16. The planetary transmission 814 includes the input shaft 17, a planetary gear arrangement 818, and the output shaft 19. The planetary gear arrangement 818 includes three planetary gearsets 820, 830, and 840, and five torque-transmitting mechanisms 850, 852, 854, 856, and 858. The torque-transmitting mechanisms 850, 852, and 854 are rotating type torque-transmitting mechanisms and the torque-transmitting mechanisms 856 and 858 are stationary type torque-transmitting mechanisms.

The planetary gearset 820 includes a sun gear member 822, a ring gear member 824, and a planet carrier assembly member 826. The planet carrier assembly member 826 includes a plurality of pinion gears 827 rotatably mounted on a planet carrier 829 and disposed in meshing relationship with both the sun gear member 822 and the ring gear member 824.

The planetary gearset 830 includes a sun gear member 832, a ring gear member 834, and a planet carrier assembly member 836. The planet carrier assembly member 836 includes a plurality of pairs of intermeshing pinion gears 837 and 838 that are rotatably mounted on planet carrier 839 and disposed in meshing relationship with the sun gear member 832 and the ring gear member 834, respectively.

The planetary gearset 840 includes a sun gear member 842, a ring gear member 844, and a planet carrier assembly member 846. The planet carrier assembly member 846 includes a plurality of pinion gears 847 rotatably mounted on a planet carrier 849 and disposed in meshing relationship with both the sun gear member 842 and the ring gear member 844.

The planet carrier assembly member 826, the ring gear member 834, and the ring gear member 844 are continuously interconnected by an interconnecting member 870. The sun gear member 822 and planet carrier assembly member 836 are continuously interconnected by an interconnecting member 872. The sun gear member 842 is continuously connected with the transmission housing 60. The ring gear member 824 is continuously connected with the output shaft 19.

The input shaft 17 is selectively connectible with the interconnecting member 872 through the torque-transmitting mechanism 850, selectively connectible with the sun gear member 832 through the torque-transmitting mechanism 852, and selectively connectible with the planet carrier assembly member 846 through the torque-transmitting mechanism 854. The interconnecting member 870 is selectively connectible with the transmission housing 60 through the torque-transmitting mechanism 856. The interconnecting member 872 is selectively connectible with the transmission housing 60 through the torque-transmitting mechanism 858. As with the other family members described above, the sun gear member 832 and planet carrier assembly member 846 are noncontinuously connected with any other of the elements of the planetary gear arrangement 818 except through the respective torque-transmitting mechanisms 852 and 854.

As seen in the truth table of FIG. 18, the torque-transmitting mechanisms are selectively engaged in combinations of two to provide six forward speed ratios and one reverse speed ratio between the input shaft 17 and the output shaft 19 through the planetary gear arrangement 818.

The reverse speed ratio is established with the engagement of the torque-transmitting mechanisms 850 and 856. During the reverse speed ratio, the sun gear member 822 is driven by the input shaft 17 and the planet carrier assembly member 826 is held stationary. The ring gear member 824 and output shaft 19 are rotated at a speed determined by the speed of the sun gear member 822 and the ring gear/sun gear tooth ratio of the planetary gearset 820. The numerical value of the reverse speed ratio is determined by the ring gear/sun gear tooth ratio of the planetary gearset 820.

The first forward speed ratio is established with the engagement of the torque-transmitting mechanisms 852 and 856. During the first forward speed ratio, the sun gear member 832 is driven by the input shaft 17, and the ring gear member 834 and planet carrier assembly member 826 are held stationary. The planet carrier assembly member 836 and sun gear member 822 are rotated at a speed determined by the speed of the sun gear member 832 and the ring gear/sun gear tooth ratio of the planetary gearset 830. The ring gear member 824 and output shaft 19 are rotated at a speed determined by the speed of the sun gear member 822 and the ring gear/sun gear tooth ratio of the planetary gearset 820. The numerical value of the first forward speed ratio is determined by the ring gear/sun gear tooth ratios of the planetary gearsets 820 and 830.

The second forward speed ratio is established with the engagement of the torque-transmitting mechanisms 852 and 858. During the second forward speed ratio, the ring gear member 834 and planet carrier assembly member 826 are rotated at a speed determined by the speed of the sun gear member 832 and the ring gear/sun gear tooth ratio of the planetary gearset 830. The ring gear member 824 and output shaft 19 are rotated at a speed determined by the speed of the planet carrier assembly member 826 and the ring gear/sun gear tooth ratio of the planetary gearset 820. The numerical value of the second forward speed ratio is determined by the ring gear/sun gear tooth ratios of the planetary gearsets 820 and 830.

The third forward speed ratio is established with the engagement of the torque-transmitting mechanisms 850 and 852. During the third forward speed ratio, the planetary gearset 830, the planetary gearset 820, and the output shaft 19, are driven in unison with the input shaft 17. The third forward speed ratio is a direct drive having a numerical value of one.

The fourth forward speed ratio is established with the engagement of the torque-transmitting mechanisms 852 and 854. During the fourth forward speed ratio, the ring gear member 844, the ring gear member 834, and the planet carrier assembly member 826 are rotated at a speed determined by the speed of the planet carrier assembly member 846 and the ring gear/sun gear tooth ratio of the planetary gearset 840. The planet carrier assembly member 836 and sun gear member 822 are rotated at a speed determined by the speed of the sun gear member 832, the speed of the ring gear member 834, and the ring gear/sun gear tooth ratio of the planetary gearset 830. The ring gear member 824 and output shaft 19 are rotated at a speed determined by the speed of the sun gear member 822, the speed of the planet carrier assembly member 826, and the ring gear/sun gear tooth ratio of the planetary gearset 820. The numerical value of the fourth forward speed ratio is determined by the ring gear/sun gear tooth ratios of all three planetary gearsets 820, 830, and 840.

The fifth forward speed ratio is established with the engagement of the torque-transmitting mechanisms 850 and 854. During the fifth forward speed ratio, the ring gear member 844 and planet carrier assembly member 826 are rotated at a speed determined by the speed of the planet carrier assembly member 846 and the ring gear/sun gear tooth ratio of the planetary gearset 840. The ring gear member 824 and output shaft 19 are rotated at a speed determined by the speed of the sun gear member 822, the speed of the planet carrier assembly member 826, and the ring gear/sun gear tooth ratio of the planetary gearset 820. The numerical value of the fifth forward speed ratio is determined by the ring gear/sun gear tooth ratios of the planetary gearsets 820 and 840.

The sixth forward speed ratio is established with the engagement of the torque-transmitting mechanisms 854 and 858. During the sixth forward speed ratio, the ring gear member 844 and planet carrier assembly member 826 are rotated at a speed determined by the speed of the planet carrier assembly member 846 and the ring gear/sun gear tooth ratio of the planetary gearset 840. The ring gear member 824 and output shaft 19 are rotated at a speed determined by the speed of the planet carrier assembly member 826 and the ring gear/sun gear tooth ratio of the planetary gearset 820. The numerical value of the sixth forward speed ratio is determined by the ring gear/sun gear tooth ratios of the planetary gearsets 820 and 840.

Figures 19, 20:
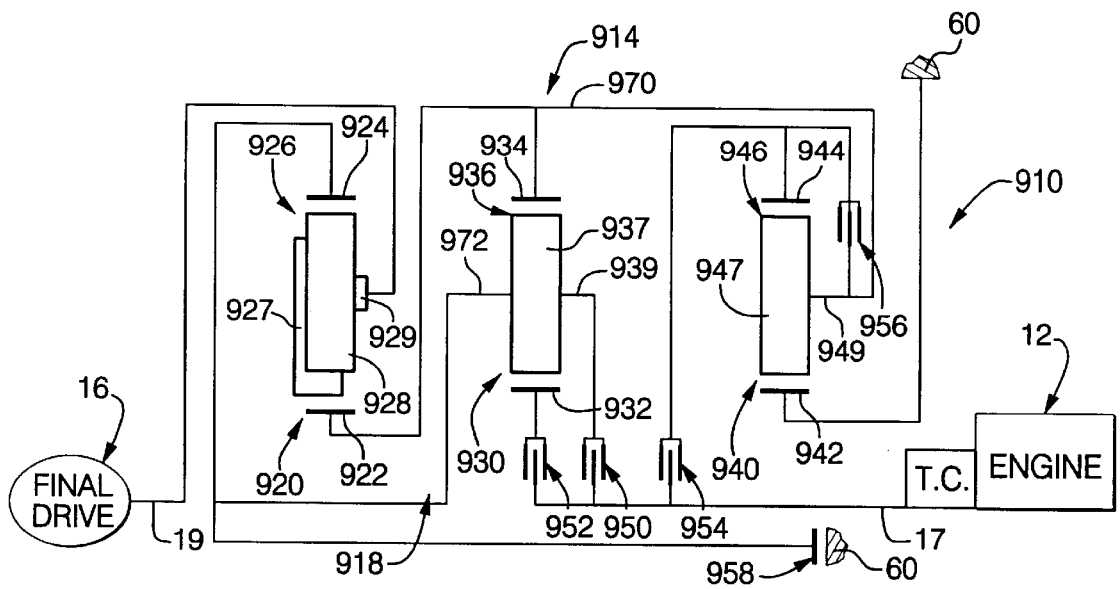
FIG. 19 is a schematic representation of a powertrain incorporating another embodiment of the present invention.
FIG. 20 is a truth table and chart depicting some of the operating characteristics of the embodiment shown in FIG. 19.

A powertrain 910, shown in FIG. 19, includes the engine and torque converter 12, a planetary transmission 914, and the final drive mechanism 16. The planetary transmission 914 includes the input shaft 17, a planetary gear arrangement 918, and the output shaft 19. The planetary gear arrangement 918 includes three planetary gearsets 920, 930, and 940, and five torque-transmitting mechanisms 950, 952, 954, 956, and 958. The torque-transmitting mechanisms 950, 952, 954, and 956 are rotating type torque-transmitting mechanisms and the torque-transmitting mechanism 958 is a stationary type torque-transmitting mechanism.

The planetary gearset 920 includes a sun gear member 922, a ring gear member 924, and a planet carrier assembly member 926. The planet carrier assembly member 926 includes a plurality of pairs of intermeshing pinion gears 927 and 928 that are rotatably disposed on a planet carrier 929 and meshing with the sun gear member 922 and the ring gear member 924, respectively.

The planetary gearset 930 includes a sun gear member 932, a ring gear member 934, and a planet carrier assembly member 936. The planet carrier assembly member 936 includes a plurality of pinion gears 937 rotatably mounted on planet carrier 939 and disposed in meshing relationship with both the sun gear member 932 and the ring gear member 934.

The planetary gearset 940 includes a sun gear member 942, a ring gear member 944, and a planet carrier assembly member 946. The planet carrier assembly member 946 includes a plurality of pinion gears 947 rotatably mounted on a planet carrier 949 and disposed in meshing relationship with both the sun gear member 942 and the ring gear member 944.

The sun gear member 922, the ring gear member 934, and planet carrier assembly member 946 are continuously interconnected by an interconnecting member 970. The ring gear member 924 and planet carrier assembly member 936 are continuously interconnected by an interconnecting member 972. The sun gear member 942 is continuously connected with the transmission housing 60. The planet carrier assembly member 926 is continuously connected with the output shaft 19.

The input shaft 17 is selectively connectible with the interconnecting member 972 through the torque-transmitting mechanism 950, selectively connectible with the sun gear member 932 through the torque-transmitting mechanism 952, and selectively connectible with the ring gear member 944 through the torque-transmitting mechanism 954. The ring gear member 944 is selectively connectible with the interconnecting member 970 through the torque-transmitting mechanism 956. The interconnecting member 972 is selectively connectible with the transmission housing 60 through the torque-transmitting mechanism 958. It will be noted that the engagement of the torque-transmitting mechanism 956 will cause the planetary gearset 940 as well as the interconnecting member 970 to remain stationary with the transmission housing 60.

As seen in the truth table of FIG. 20, the torque-transmitting mechanisms are engaged in combinations of two to provide six forward speed ratios and one reverse speed ratio between the input shaft 17 and output shaft 19 through planetary gear arrangement 918. The truth table also provides an example of numerical values for the speed ratios. These numerical values are determined utilizing the values of the ring gear/sun gear tooth ratios for the planetary gearsets 920, 930, and 940 as given in FIG. 20 as R1/S1, R2/S2, and R3/S3, respectively. Also provided in FIG. 20 is a chart depicting the ratio steps between adjacent forward speed ratios as well as the ratio step between reverse and the first forward speed ratio. As with the previous members described above, all of the single step and double step forward interchanges are of the single transition variety.

The reverse speed ratio is established with the engagement of the torque-transmitting mechanisms 954 and 958. During the reverse speed ratio, the planet carrier assembly member 946 and sun gear member 922 are rotated at a speed determined by the speed of the ring gear member 944 and the ring gear/sun gear tooth ratio of the planetary gearset 940. The planet carrier assembly member 926 and output shaft 19 are rotated at a speed determined by the speed of the sun gear member 922 and the ring gear/sun gear tooth ratio of the planetary gearset 920. The numerical value of the reverse speed ratio is determined by the ring gear/sun gear tooth ratios of the planetary gearsets 920 and 940.

The first forward speed ratio is established with the engagement of the torque-transmitting mechanisms 952 and 958. During the first forward speed ratio, the ring gear member 934 and sun gear member 922 are rotated at a speed determined by the speed of the sun gear member 932 and the ring gear/sun gear tooth ratio of the planetary gearset 930. The planet carrier assembly member 926 and output shaft 19 are rotated at a speed determined by the speed of the sun gear member 922 and the ring gear/sun gear tooth ratio of the planetary gearset 920. The numerical value of the first forward speed ratio is determined by the ring gear/sun gear tooth ratios of the planetary gearsets 920 and 930.

The second forward speed ratio is established with the engagement of the torque-transmitting mechanisms 952 and 956. During the second forward speed ratio, the planet carrier assembly member 936 and ring gear member 924 are rotated at a speed determined by the speed of the sun gear member 932 and the ring gear/sun gear tooth ratio of the planetary gearset 930. The planet carrier assembly member 926 and output shaft 19 are rotated at a speed determined by the speed of the ring gear member 924 and the ring gear/sun gear tooth ratio of the planetary gearset 920. The numerical value of the second forward speed ratio is determined by the ring gear/sun gear tooth ratios of the planetary gearsets 920 and 930.

The third forward speed ratio is established with the engagement of the torque-transmitting mechanisms 952 and 954. During the third forward speed ratio, the ring gear member 944 and the sun gear member 932 are both driven by the input shaft 17. The planet carrier assembly member 946, the ring gear member 934, and the sun gear member 922 are rotated at a speed determined by the speed of the ring gear member 944 and the ring gear/sun gear tooth ratio of the planetary gearset 940. The planet carrier assembly member 936 and ring gear member 924 are rotated at a speed determined by the speed of the sun gear member 932, the speed of the ring gear member 934, and the ring gear/sun gear tooth ratio of the planetary gearset 930. The planet carrier assembly member 926 and output shaft 19 are rotated at a speed determined by the speed of the sun gear member 922, the speed of the ring gear member 924, and the ring gear/sun gear tooth ratio of the planetary gearset 920. The numerical value of the third forward speed ratio is determined by the ring gear/sun gear tooth ratios of all three planetary gearsets 920, 930, and 940.

The fourth forward speed ratio is established with the engagement of the torque-transmitting mechanisms 950 and 952. The fourth forward speed ratio is a direct drive having a numerical value of one.

The fifth forward speed ratio is established with the engagement of the torque-transmitting mechanisms 950 and 954. During the fifth forward speed ratio, the planet carrier assembly member 946 and ring gear member 922 are rotated at a speed determined by the speed of the ring gear member 944 and the ring gear/sun gear tooth ratio of the planetary gearset 940. The planet carrier assembly member 926 and output shaft 19 are rotated at a speed determined by the speed of the ring gear member 924, the speed of the sun gear member 922, and the ring gear/sun gear tooth ratio of the planetary gearset 920. The numerical value of the fifth forward speed ratio is determined by the ring gear/sun gear tooth ratios of the planetary gearsets 920 and 940.

The sixth forward speed ratio is established with the engagement of the torque-transmitting mechanisms 950 and 956. During the sixth forward speed ratio, the ring gear member 924 is driven by the input shaft 17. The planet carrier assembly member 926 and therefore output shaft 19 are rotated at a speed determined by the speed of the ring gear member 924 and the ring gear/sun gear tooth ratio of the planetary gearset 920. The numerical value of the sixth forward speed ratio is determined by the ring gear/sun gear tooth ratio of the planetary gearset 920.

From the foregoing description, it will be appreciated that each of the family members has the following characteristics in common. Each family member has two planetary gearsets with three members each. The first members of each of the planetary gearsets are continuously interconnected by a first interconnecting member. The second members of the first and second planetary gearsets are continuously interconnected by an interconnecting member. The second member of the third planetary gearset is continuously connected with a transmission housing. The output shaft is continuously connected with at least one of the planetary gear members.

Each family member includes five torque-transmitting mechanisms three of which are selectively connectible between the input shaft and members of the planetary gearset. The remaining two torque-transmitting mechanisms act either as brakes or one of the torque-transmitting mechanisms can operate as a rotating type, however, it effectively applies a retarding force to members of the planetary gearset.

Also in each of the transmission family members, there are at least two planetary members that are not continuously interconnected with other members of the planetary gear arrangements except through selectively engageable torque-transmitting mechanisms.

What is claimed is:

1. A family of six-speed transmissions, each family member comprising:

an input shaft;

an output shaft;

a transmission housing;

a planetary gear arrangement including a first planetary gearset, a second planetary gearset, a third planetary gearset, a first interconnecting member, a second interconnecting member, and five torque transmitting mechanisms;

said first planetary gearset having a first member, a second member, and a third member, said second planetary gearset having a first member, a second member, and a third member, said third planetary gearset having a first member, a second member, and a third member;

said first interconnecting member continuously interconnecting said first member of said first planetary gearset, said first member of said second planetary gearset, and said first member of said third planetary gearset;

said second interconnecting member continuously interconnecting said second member of said first planetary gearset and said second member of said second planetary gearset;

said second member of said third planetary gearset being continuously interconnected with said transmission housing;

said output shaft being continuously interconnected with at least one member of one of said planetary gearsets;

a first of said torque transmitting mechanisms being operable to selectively interconnect said input shaft with a member of a first group consisting of said members of said first and second planetary gearsets;

a second of said torque transmitting mechanisms being operable to selectively interconnect said input shaft with a member of a second group consisting of said members of said second and third planetary gearsets;

a third of said torque transmitting mechanisms being operable to selectively interconnect said input shaft with a member of a third group consisting of said members of said first, second, and third planetary gearsets;

a fourth of said torque transmitting mechanisms being operable to either selectively interconnect one member of said third group with another member of said third group or selectively interconnecting said transmission housing with a member of a fourth group consisting of said members of said second and third planetary gearsets and said interconnecting members;

a fifth of said torque transmitting mechanisms being operable to selectively interconnect said transmission housing with a member of said third group; and said five torque transmitting mechanisms being operable in combinations of two to establish six forward speed ratios and one reverse speed ratio between said input shaft and said output shaft through said planetary gear arrangement.

2. The family of transmissions defined in claim 1 further wherein:

each of said first members of said first, second, and third planetary gearsets is a member of a sixth group consisting of a sun gear member, a ring gear member, and a planet carrier assembly member;

each of said second member of said first, second, and third planetary gearsets is a member of said sixth group that is not the first member of the first, second, and third planetary gearsets; and each of said third members of said first, second, and third planetary gearsets is the remaining member of said sixth group.

3. The family of transmissions defined in claim 1 further wherein:

said second member of said third planetary gearset is a sun gear member or a ring gear member, said third member of said first and second planetary gearsets is a sun gear member, and said third member of said third planetary gearset is a sun gear member, a ring gear member, or a planet carrier assembly member.

4. The family of transmissions defined in claim 1 further wherein:

said first torque transmitting mechanism selectively interconnects said input shaft with said second member of said first planetary gearset;

said second torque transmitting mechanism selectively interconnects said input shaft with said third member of said first or second planetary gearset; and said third torque transmitting mechanism selectively interconnects said input shaft with said third member of said third planetary gearset.

5. The family of transmissions defined in claim 4 further wherein;

said fifth torque transmitting mechanism selectively interconnects said transmission housing with said second interconnecting member or said third member of said third planetary gearset.

6. The family of transmissions defined in claim 4 further wherein:

said fourth torque transmitting mechanism selectively interconnects said transmission housing with either said first or second interconnecting member.

7. The family of transmissions defined in claim 4 further herein:

said fourth torque transmitting mechanism selectively interconnects said third member of said third planetary gearset with said first interconnecting member.

8. A family of six speed transmissions, each family member comprising:

an input shaft;

an output shaft;

a transmission housing;

a first planetary gearset having first, second, and third members;

a second planetary gearset having first, second, and third members;

a third planetary gearset having first, second, and third members, said second member being continuously interconnected with said transmission housing;

said output shaft being continuously interconnected with a member of a group consisting of said third members of said first and second planetary gearsets;

a first interconnecting member continuously interconnecting said first member of said first planetary gearset, said first member of said second planetary gearset, and said first member of said third planetary gearset;

a second interconnecting member continuously interconnecting said second member of said first planetary gearset and said second member of said second planetary gearset;

a first torque transmitting mechanism selectively interconnecting said input shaft with said second interconnecting member;

a second torque transmitting mechanism selectively interconnecting said input shaft with a member of a group consisting of said third members of said first and second planetary gearsets;

a third torque transmitting mechanism selectively interconnecting said input shaft with said third member of said third planetary gearset;

a fourth torque transmitting mechanism selectively interconnecting a member of a group consisting of said transmission housing and said third member of said third planetary gearset with a member of a group consisting of said interconnecting members;

a fifth torque transmitting mechanism selectively interconnecting said transmission housing with a member of a group consisting of said third member of said third planetary gearset and said second interconnecting member; and said torque transmitting mechanisms being selectively engaged in combinations of two to establish at least six forward speed ratios and one reverse speed ratio between said input shaft and said output shaft through at least one of said planetary gearsets.

9. A family of six speed transmissions, each family member comprising:

an input shaft;

an output shaft;

a transmission housing;

a first planetary gearset having first, second, and third members;

a second planetary gearset having first, second, and third members;

a third planetary gearset having first, second, and third members, said second member being continuously interconnected with said transmission housing;

said output shaft being continuously interconnected with at least one member of said planetary gearsets;

said input shaft being selectively connectible with members of said planetary gearsets through selectively engageable torque transmitting mechanisms;

a first interconnecting member continuously interconnecting said first member of said first planetary gearset, said first member of said second planetary gearset, and said first member of said third planetary gearset;

a second interconnecting member continuously interconnecting said second member of said first planetary gearset and said second member of said second planetary gearset;

five torque transmitting mechanisms selectively interconnecting members of said planetary gearsets with said transmission housing, or other members of said planetary gearsets;

said torque transmitting mechanisms being selectively engaged in combinations of two to establish at least six forward speed ratios and one reverse speed ratio between said input shaft and said output shaft through at least one of said planetary gearsets.

* * * * *